US012634632B2

(12) United States Patent
Bakardjiev

(10) Patent No.: US 12,634,632 B2
(45) Date of Patent: May 19, 2026

(54) SPEAKERS AND METHODS

(71) Applicant: Technische Universitat Dresden, Korperschaft des offentlichen Rechts, Dresden (DE)

(72) Inventor: Petko Bakardjiev, Dresden (DE)

(73) Assignee: Technische Universität Dresden, Korperschaft des offentlichen Rechts (DE)

(*) Notice: Subject to any disclaimer, the term of this patent is extended or adjusted under 35 U.S.C. 154(b) by 146 days.

(21) Appl. No.: 18/839,522

(22) PCT Filed: Feb. 1, 2023

(86) PCT No.: PCT/EP2023/052421
§ 371 (c)(1),
(2) Date: Aug. 19, 2024

(87) PCT Pub. No.: WO2023/160974
PCT Pub. Date: Aug. 31, 2023

(65) Prior Publication Data

US 2025/0168568 A1 May 22, 2025

(30) Foreign Application Priority Data

Feb. 22, 2022 (DE) ..................... 10 2022 104 179.4

(51) Int. Cl.
*H04R 7/12* (2006.01)
*H04R 19/02* (2006.01)

(52) U.S. Cl.
CPC ............. *H04R 7/125* (2013.01); *H04R 19/02* (2013.01); *H04R 2307/025* (2013.01); *H04R 2307/027* (2013.01)

(58) Field of Classification Search
None
See application file for complete search history.

(56) References Cited

U.S. PATENT DOCUMENTS 3,345,469 A * 10/1967 Rod ........................ H04R 19/02 381/191
3,859,477 A 1/1975 Skvor
(Continued)

FOREIGN PATENT DOCUMENTS

| | | | |
|---|---|---|---|
| DE | 2114163 | A1 | 9/1972 |
| DE | 102012019860 | A1 | 4/2014 |
| WO | 2018/207707 | A1 | 11/2018 |

OTHER PUBLICATIONS

International Search Report and Written Opinion issued in PCT/EP2023/052421, dated Apr. 3, 2023. For informational purposes only.

(Continued)

*Primary Examiner* — Walter F Briney, III
(74) *Attorney, Agent, or Firm* — BARNES & THORNBURG LLP; Jeffrey R. Stone

(57) ABSTRACT

A speaker and a method are disclosed, where the speaker comprises a rotary actuator comprising a wound laminate. The laminate comprises a first layer and a second layer each comprising or consisting of a dielectric elastomer, a first electrode disposed between the first layer and the second layer in direct contact therewith. The laminate also comprises a second metal layer disposed between and electrically conductively connected to a first sub-layer of the first electrode and a second sub-layer of the first electrode. The laminate also comprises a second electrode disposed on a side of the first layer distal from the first electrode and in direct contact with the first layer; a third electrode disposed on a side of the second layer distal from the first electrode and in direct contact with the second layer. The laminate also comprises a first metal layer electrically conductively connected to the third electrode.

15 Claims, 16 Drawing Sheets

(56) References Cited

U.S. PATENT DOCUMENTS

| | | | | |
|---|---|---|---|---|
| 8,378,551 | B2 * | 2/2013 | Hino | F03G 7/029<br>310/300 |
| 2004/0217671 | A1 * | 11/2004 | Rosenthal | A61M 5/142<br>310/328 |
| 2007/0114885 | A1 * | 5/2007 | Benslimane | H10N 30/098<br>310/311 |
| 2012/0060355 | A1 * | 3/2012 | Tsuchikawa | H10N 30/506<br>29/592.1 |
| 2015/0221861 | A1 * | 8/2015 | Biggs | H10N 30/883<br>156/221 |
| 2019/0176192 | A1 * | 6/2019 | Nakano | B06B 1/0292 |
| 2021/0146401 | A1 | 5/2021 | Naata et al. | |

OTHER PUBLICATIONS

German Office Action issued in application No. 10 2022 104 179.4, dated Apr. 7, 2023. For information purposes only.

Petko Bakardjiev et al: “Entwicklung eines Lautsprecherantriebs aus dielektrischem Elastomer”, DAGA 2016: DAGA 2016, Aachen : Mar. 14-17, 2016: DAGA 2016 Achen. For informational purposes only.

Rajamani et al. “Wound Roll Dielectric Elastomer Actuators: Fabrication, Analysis, and Experiments”, IEEE/ASME Transations on Mechatronics, vol. 13, No. 1, Feb. 2008.

* cited by examiner

400

600

SPEAKERS AND METHODS

CROSS-REFERENCE TO RELATED APPLICATION(S)

This application is a national phase of PCT/EP2023/052421 filed on Feb. 1, 2023 that claims priority to German Patent Application No. 10 2022 104 179.4 filed on Feb. 22, 2022, the contents of both of which are incorporated herein by reference in their entirety.

TECHNICAL FIELD

Various embodiments relate to a speaker and a method of manufacturing a speaker.

BACKGROUND

Speakers may be realized with electrodynamic drivers, with capacitive drivers or with piezoelectric drivers, with electrodynamically driven speakers being the most common. However, electrodynamic speakers have a comparatively low efficiency (e.g. less than 1%) due to the limited magnetic flux density in the air gap, the current-dependent force effect, etc. and a comparatively high mass due to the permanent magnets used. In order to achieve radiation at a large angle using electrodynamic speakers, it is necessary to provide different electrodynamic drivers and radiating surfaces of different sizes for different frequency ranges.

BRIEF SUMMARY

According to various embodiments, a speaker and a method for manufacturing a speaker are provided, wherein the speaker enables reproduction of acoustic signals over a comparatively wide frequency range (e.g. speech, music, etc.) at a large dispersion angle. This is made possible, for example, by winding a laminate comprising, among other things, a dielectric elastomer arranged between electrodes in such a way that the wound laminate extends both in the axial direction (also referred to as longitudinal direction) and in the radial direction by applying a respective voltage to the electrodes. This volume displacement in the axial direction and radial direction (also referred to as the transverse direction) may be used to generate acoustic signals.

For example, the rotary actuator may take on both the function of the driver and the function of the elastic bearing and optionally also the function of the radiating surface. Illustratively, this enables a higher degree of functional integration compared to conventional speakers.

Furthermore, unlike electrodynamic speakers, the speaker does not require permanent magnets, which means that the speaker may have a lower mass than electrodynamic speakers. As a result, the speaker may be advantageously used, for example, where weight savings lead to (e.g. significant) cost reductions, such as in the aerospace industry (e.g. in airplanes as a speaker for announcements by airplane personnel). Illustratively, the speaker described herein may enable better spatial intelligibility (e.g. for announcements) compared to speakers with an electrodynamic driver.

BRIEF DESCRIPTION OF THE DRAWINGS

In the following description, various exemplary aspects of the disclosure are described with reference to the following drawings, in which.

DESCRIPTION

In the following detailed description, reference is made to the accompanying drawings, which form part thereof and in which specific embodiments in which the invention may be practiced are shown for illustrative purposes.

For public announcements, such as in buses, on trains, in airplanes, at train stations, at airports, etc. and/or telephone conferences, it may be necessary to use speakers which have a large dispersion angle (i.e. a wide dispersion characteristic) over a comparatively wide frequency range, so that both people who are far away and people who are directly below or next to the speaker may hear the announcement(s). Various embodiments relate to a speaker and a method of manufacturing the same, which has a wide radiation characteristic over a wide frequency range. Furthermore, the speaker comprises a lower mass compared to conventional electrodynamic speakers, so that fuel may be saved in buses, trains and airplanes, for example.

Various embodiments relate to a rotary actuator which allows for full volume increase (also referred to as full volume expansion). It will be understood that this full volume increase of the rotary actuator, as described herein, may be accompanied by a constant volume deformation of the elastomer. The rotary actuator may have the shape of a cylinder or at least a cylinder-like shape. According to various embodiments, the rotary actuator may have the shape of a hollow cylinder. The base of the (hollow) cylinder may be an ellipse (e.g. a circle). However, the cylinder may also have a spiral-shaped base surface. The area enclosed by the spiral base surface may be essentially elliptical (e.g. circular). The spirally extending base surface may be parallel displaced (like a cylinder) along a straight line (e.g. a straight line perpendicular to the base surface). In the case where the base surface of the cylinder is an elliptical (e.g. circular) surface, the rotary actuator may have one or more layer stacks which are substantially concentric with the lateral surface of the cylinder. In the following, the rotary actuator is described by way of example for a base surface running in a spiral. It will be understood that the rotary actuator may also have the elliptical (e.g. circular) base surface formed by the one or more layer stacks, whereby the sequence, arrangement and features of the layers described below (e.g. electrodes, metal layer(s), etc.) may also apply in an analogous manner to the layers of the rotary actuator with an elliptical base surface.

Figure 1A:
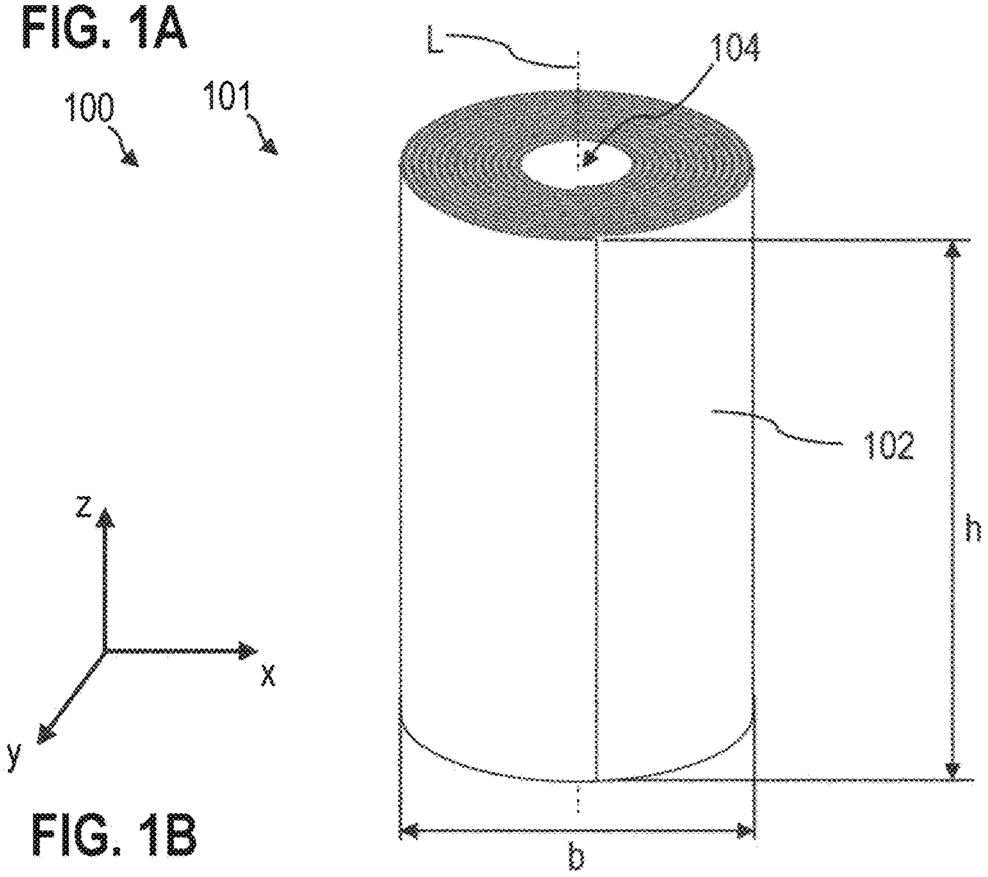
FIGS. 1A to 1H each show a speaker according to various embodiments.
Figure 1B:
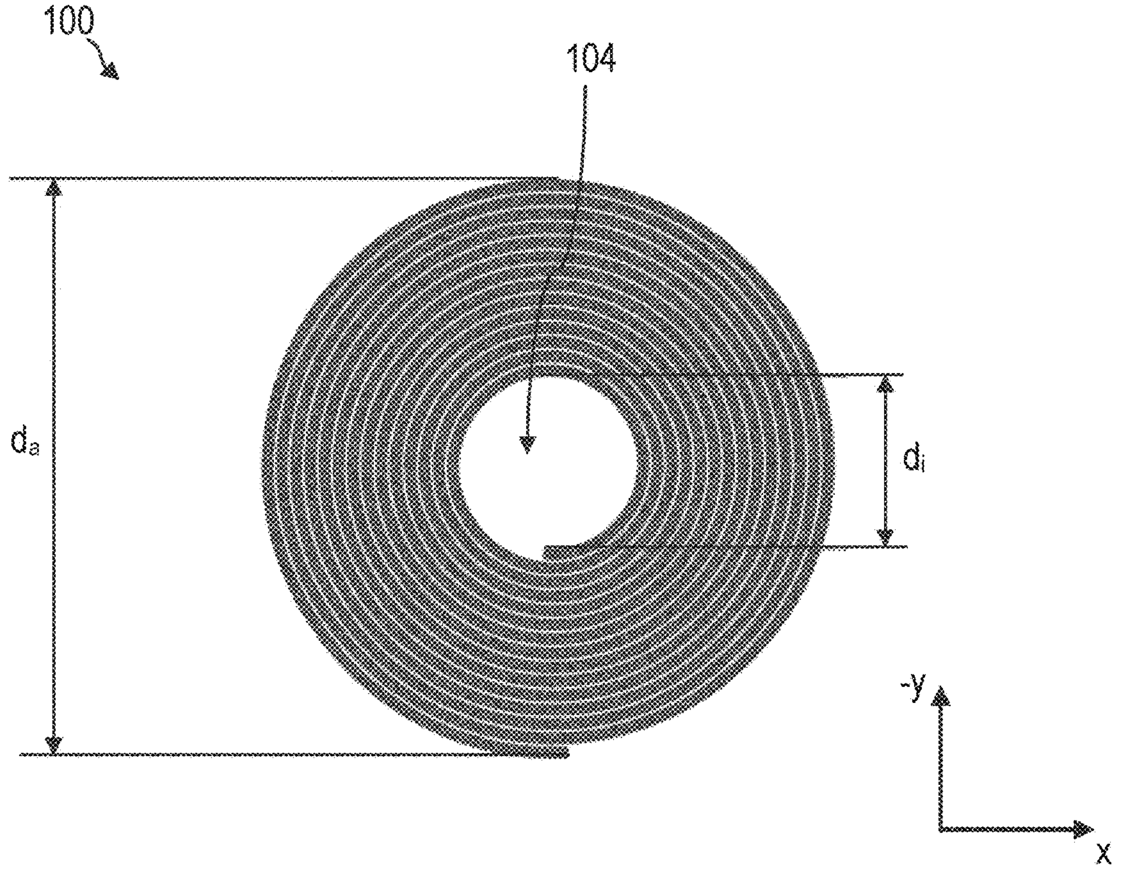

FIG. 1A shows a speaker 100 according to various embodiments. The speaker 100 may comprise a rotary actuator 101. The rotary actuator 101 may serve as a driver (also referred to as an (electromechanical) driver in some aspects) of the speaker 100. The rotary actuator 101 may be configured to convert electrical signals (e.g., applied voltages) into mechanical movement (see, for example, FIG. 2A and FIG. 2B and associated description). FIG. 1B shows an exemplary top view of the rotary actuator 101.

The rotary actuator 101 may comprise or be formed by a wound laminate 102. The rotary actuator 101 (e.g., the wound laminate 102) may be longitudinally extended in an axial direction (e.g., z-direction). As used herein, "longitudinally extended in an axial direction" may be understood to mean that the length of the rotary actuator is at least twice (e.g., at least three times, e.g., at least four times, etc.) greater in the axial direction than perpendicular to the axial direction. The direction perpendicular to the axial direction may also be referred to as the radial direction (e.g. x-direction). Illustratively, a height, h, of the rotary actuator 101 may be at least two times greater than the width, b, of the rotary actuator 101. Alternatively, the length of the rotary actuator in the axial direction may also be smaller than the width of the rotary actuator 101 (perpendicular to the axial direction).

The wound laminate 102 may be arranged in a spiral around the longitudinal axis L (e.g., parallel to the z-axis) (e.g., as a planar Archimedean spiral). According to various embodiments, the wound laminate 102 may be arranged in a plurality of windings (e.g., at least two windings, e.g., at least five windings, e.g., at least ten windings, etc.) around the longitudinal axis L. Each winding of the plurality of windings may at least partially contact the subsequent winding of the laminate 102. It will be understood that two successive windings may be spaced apart in individual regions. For example, air may be present between the successive windings in these regions.

Figure 1C:
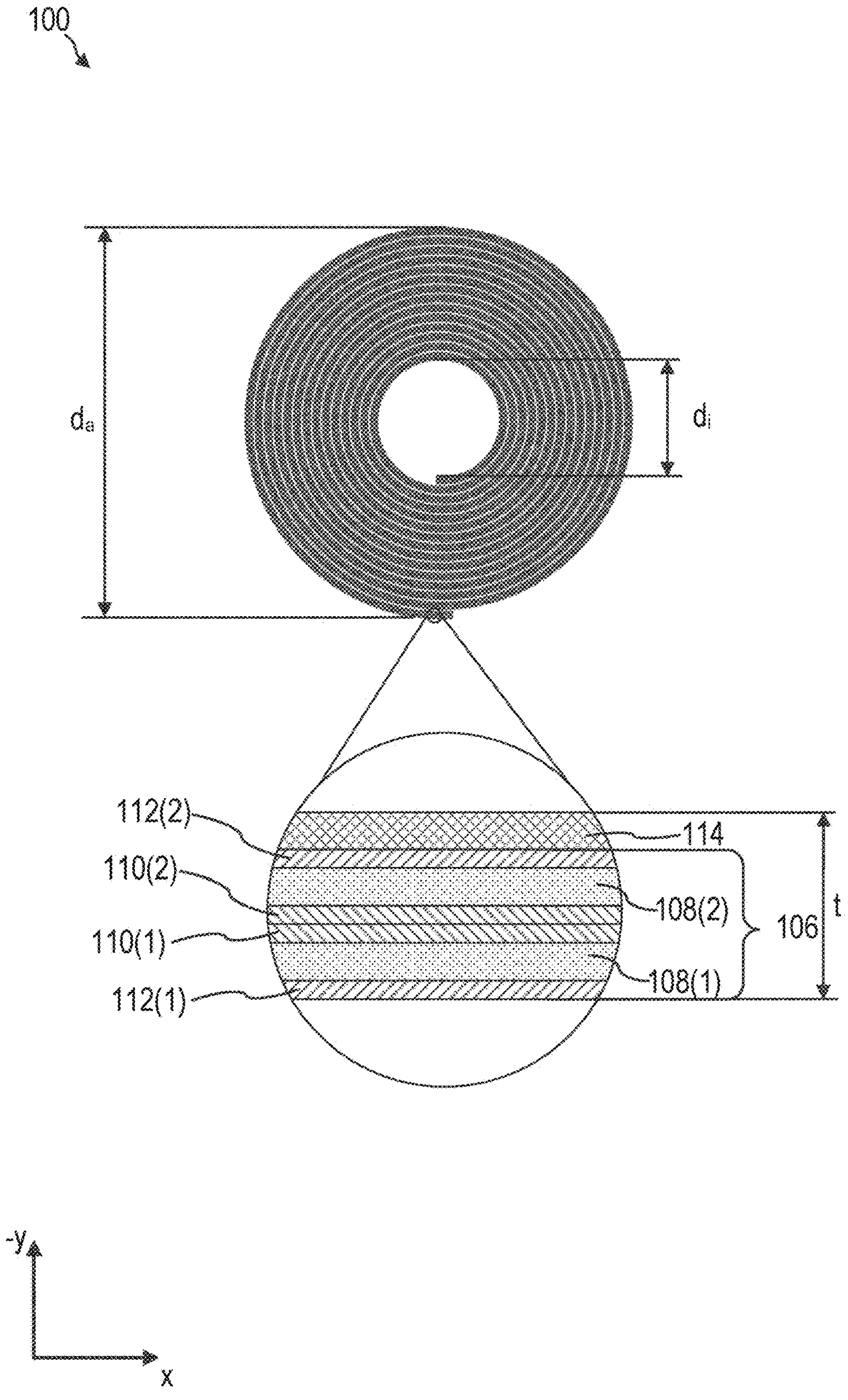

The laminate 102 may have a thickness, t, in each winding (see, for example, FIG. 1C). Therefore, the wound laminate 102 may have a spiral base surface (e.g., in the xy plane-) (see, for example, FIG. 1B). This spirally extending base surface may be parallel displaced along the axial direction, z, so that each cross-section of the wound laminate 102 parallel to the x-y plane has a spirally extending cross-sectional area substantially equal to the spirally extending base surface. Illustratively, the wound laminate 102 may have the shape of a cylinder with a spiral base (also referred to as a spiral cylinder in some aspects).

The wrapped laminate 102 may at least partially enclose a cavity 104. For example, the wrapped laminate 102 may completely enclose the cavity 104 around the longitudinal axis L. Illustratively, a region enclosed by the wrapped laminate 102 may form a cavity. Illustratively, the wrapped laminate 102 may have the shape of a hollow cylinder with a spiral base. The spiral-shaped base surface may be (e.g. a flat Archimedean spiral and) be characterized by an (e.g. minimum) inner diameter, $d_i$, and an (e.g. maximum) outer diameter, $d_a$. The inner diameter, $d_i$, of the spiral base may define a size of the cavity 104. According to various embodiments, the outer diameter, $d_a$, may be at least 1.3 times (e.g. at least 1.5 times, e.g. at least twice) as large as the inner diameter, $d_i$. If the ratio of the outer diameter, $d_a$, to the inner diameter, $d_i$, is greater than 1.3 (e.g. greater than or equal to two (e.g., greater than three, e.g., greater than four, e.g., greater than five, etc.)), this may enable the amplitude and/or structural resonance required to radiate sound perpendicular to the axial direction of the rotary actuator (see, e.g., description of FIG. 2B). This ratio may, for example, ensure that the rotary actuator 101 (also referred to as the actuator in some aspects) does not buckle under axial load (even by its own inertia in resonance) and thus a force effect may be generated on a connected structure (e.g., the cover caps described herein, the vibrating body (e.g., the speaker diaphragm) of the speaker 300, etc.). Due to this surface transformation (transfer of the movement to a larger surface to achieve the necessary sound flow), the radiation behavior of low frequencies may be improved, among other things. Illustratively, this diameter ratio may be critical for the usability of the axial direction (i.e. the radiation in the axial direction), insofar as the cylinder is not axially preloaded (e.g. by internal or external springs), but this may lead to a significant increase in the lowest usable frequency. Due to the compliance mismatch of the actuator material, the axial resonance with respect to the diameter ratio does not change. On the other hand, this may be a critical factor for the radial amplitude and/or the frequency. The cavity 104 may optionally be filled with a dielectric material. In the exemplary cross-section shown in FIG. 1B, the innermost winding of the spiral encloses a substantially circular region which forms the cavity 104. It will be understood that the innermost winding of the spiral may enclose any type of elliptical region (with the circular region being a special case). For example, in this case, each winding of the spiral may be similar to the shape of an ellipse (with an offset resulting from the spiral character).

According to various embodiments, the movement of the rotary actuator may be characterized by structural dynamic resonances in axial and radial directions (deflections). Depending on the set ratios of the actuator dimensions, the structure and the design extensions (e.g. surfaces or surface ratios), these may be such that acoustically effective sound fluxes/sound pressures may be generated. The ratios may be designed in such a way that one component is axially or radially dominant for sound generation or the regions are preferably superposed by design. This results, for example, in the possibility of specifically influencing the frequency behavior and the radiation characteristics.

With reference to FIG. 1C, the laminate 102 may include a substrate sheet 106 (referred to as sheet 106 in some aspects). The substrate sheet 106 may comprise a first layer 108(1) and a second layer 108(2). The first layer 108(1) and the second layer 108(2) may each comprise or consist of a dielectric elastomer (e.g., the same dielectric elastomer). For example, the dielectric elastomer may comprise an acrylate, a silicone, and/or a polyurethane. According to various embodiments, the dielectric elastomer may comprise a silicone, which has a lower viscous behavior compared to the other material (creep processes are consequently reduced). Furthermore, the silicone may be resistant to environmental influences, such as ultraviolet (UV) radiation, and may have a higher heat resistance (e.g. for silicone kitchen utensils). The ageing process of silicones may also be significantly lower compared to acrylates and/or polyurethanes, so that the properties remain unchanged over a longer period of time or change less over a longer period of time.

Examples of dielectric elastomer materials are Danfoss-Polypower, Elastosil® and NEXIPAL®. Examples of dielectric elastomer materials are: silicone (Nusil, CF19-2186), silicone (Nusil, CF19-2186), silicone (Dow Corning, HS3), silicone (Dow Corning, Sylgard 186), silicone (Burman, Cine-Skin ArBrC), silicone (BJB, TC-5005), silicone (Dow Corning, Sylgard 184), silicone (Wacker Elastosil RT 625), silicone (BlueStar, MF620U), fluorosilicone (Dow Corning 730), fluoroelastomer (Lauren L143HC), PU (Dccrfield PT6100S), NR latex, HNBR (Zetpol 3310, ACN content 25%), NBR, acrylic (3M VHB 4910), SEBS 75 (GLS Corp), SEBS 217 (GLS Corp), SEBS (Elastoteknik AB Dryflex 500040), SEBS-g-MA (Kraton), IPN (VHB 4905-TMPTMA), IPN (VHB 4910-TMPTMA), PTBA, Sylgard 184 5:1, Sylgard 184, Sylgard 184 15:1, Sylgard 184 20:1, Sylgard 186 5:1, Sylgard 186, a mixture of Sylgard 184 and Sylgard 186 (whereby different degrees of cross-linking are possible), Sylgard MIX 1:3, Sylgard MIX 1:1, Sylgard MIX 3:1, Ecoflex 00-50, Eco MIX 00-50 1:3, Eco MIX 00-50 1:1, Eco MIX 00-50 3:1, Ecoflex 00-30, Eco MIX 00-30 1:3, Eco MIX 00-30 1:1, Eco MIX 00-30 3:1, Ecoflex 00-10, Eco MIX 00-10 1:3, Eco MIX 00-10 1:1, Eco MIX 00-10 3:1.

The substrate sheet 106 may further comprise a first electrode 110(1), 110(2). The first electrode 110(1), 110(2) may be disposed between the first layer 108(1) and the second layer 108(2). The first electrode 110(1), 110(2) may be disposed in direct (e.g., physical and/or electrical) contact with the first layer 108(1) and the second layer 108(2). In one example, the first layer 108(1) may be coated with an electrode layer (e.g., 110(1)) and the second layer 108(2) may be coated with an electrode layer (e.g., 110(2)) and the two electrode layers may physically and electrically contact each other. In another example, the second layer 108(2), the first electrode 110(1), 110(2), and the first layer 108(1) may be formed as a stack of layers. As described herein, the first electrode may comprise a single electrode layer or may alternatively comprise two sub-layers (e.g., formed by folding the first electrode layer 110).

The substrate sheet 106 may comprise a second electrode 112(1). The second electrode 112(1) may be disposed on a side of the first layer 108(1) that is distal from the first electrode 110(1), 110(2). The second electrode 112(1) may be disposed in direct (e.g., physical and/or electrical) contact with the first layer 108(1).

The substrate sheet 106 may comprise a third electrode 112(2). The third electrode 112(2) may be disposed on a side of the second layer 108(2) that is distal from the first electrode 110(1), 110(2). The third electrode 112(2) may be arranged in direct (e.g., physical and/or electrical) contact with the second layer 108(2). In the case where the rotary actuator does not comprise a metal layer or metal film, the second electrode 112(1) and the third electrode 112(2), which are adjacent to and in physical contact with each other, may be formed of a single layer.

The first electrode 110(1), 110(2), the second electrode 112(1) and the third electrode 112(2) may comprise or consist of an electrically conductive material. For example, the first electrode 110(1), 110(2), the second electrode 112(1) and/or the third electrode 112(2) may each: comprise or consist of silver, or comprise or consist of silicone with carbon black particles, or comprise or consist of silicone with carbon nanotubes, or comprise or consist of silicone with graphene particles, or comprise or consist of silicone with silver nanowires, or comprise or consist of a silicon coated with a metal layer (e.g., comprising or consisting of iron, copper, nickel, etc.). According to various embodiments, the first electrode 110(1), 110(2), the second electrode 112(1), and the third electrode 112(2) may comprise a material (e.g., an array of materials) that is stretchable (e.g., comprising or consisting of one or more metals, carbon nanotubes, etc.) within the extent of the wrapped laminate 102 (see description of FIG. 2A and FIG. 2B). This stretchability of the electrodes may, for example, be inherent in the material and/or may be created by means of structuring.

According to various embodiments, the thickness of the first layer 108(1) and/or the thickness of the second layer 108(2) may be in a region from about 5 μm to about 500 μm (e.g., in a region from about 50 μm to about 120 μm).

In one example, the first layer 108(1) and the second layer 108(2) may be composed entirely or substantially entirely of a silicone and have a thickness of approximately 80 μm. The first electrode 110(1), 110(2), the second electrode 112(1) and the third electrode 112(2) may, for example, each consist entirely or substantially entirely of silver, which may have a thickness of approximately 110 nm, for example.

In another example, the dielectric elastomer may be Elastosil® and may have a thickness in a region from about 50 μm to about 100 μm. The first electrode 110(1), 110(2), the second electrode 112(1), and the third electrode 112(2) may each comprise, for example, silicone comprising carbon black particles and may each have a thickness in a region from about 20 μm to about 40 μm.

Optionally, the laminate 102 may further comprise a metal layer. In the following, the metal layer is described, by way of example, as metal film 114. It will be understood that the metal film is an exemplary metal layer and that the metal layer may also be any other type of metallic layer, such as a metallic layer produced by means of physical and/or chemical vapor deposition, by means of dip coating, by means of spray coating, etc.

The metal film 114 may comprise or consist of a metal or a metal alloy. The metal or metal alloy may have an electrical conductivity greater than or equal to $30 \cdot 10^6$ S/m (Siemens per meter). The metal film 114 may, for example, be made of aluminum or an aluminum alloy.

According to various embodiments, the thickness of the metal film 114 may be less than half the thickness of the laminate. This may reduce (e.g., prevent) separation of the individual film layers of the wrapped laminate, thereby ensuring stability and functionality of the rotary actuator 101. For example, the first layer 108(1) and the second layer 108(2) may comprise Elastosil® having a thickness of about 100 μm, and the first electrode, the second electrode, and the third electrode may have a thickness of about 20 μm. In this example, the thickness of the metal film 114 may be less than about 60 μm. In another example, the first layer 108(1) and the second layer 108(2) may comprise a silicone (e.g., Danfoss Polypower) having a thickness of about 80 μm and the first electrode, the second electrode, and the third electrode may have a thickness of about 100 nm. In this example, the thickness of the metal film 114 may be less than about 60 μm.

The first electrode 110(1), 110(2), the second electrode 112(1) and the third electrode 112(2) may, for example, each consist of silver, which may, for example, have a thickness of approximately 110 nm.

In another example, the dielectric elastomer may be Elastosil® and may have a thickness in a region of about 50 μm to about 100 μm. The first electrode 110(1), 110(2), the second electrode 112(1), and the third electrode 112(2) may each comprise silicone comprising carbon black particles, for example, and may each have a thickness in a region from about 20 μm to about 40 μm.

In one example, the metal film 114 may be an aluminum film approximately 12 μm thick. An aluminum film is advantageous, for example, as it comprises both an electrical conductivity greater than $30 \cdot 10^6$ S/m and a comparatively low mass (e.g. compared to other metal films). The comparatively low mass may, for example, improve the vibration behavior of the rotary actuator 101. The passivation layer (oxide layer) of the aluminum film may also provide high corrosion resistance.

The metal film 114 may be electrically conductively connected to the substrate sheet 106. For example, the metal film 114 may be electrically conductively connected to the third electrode 112(2) (or alternatively, the second electrode 112(1)). The metal film 114 may be in direct physical contact with the respective layer to provide the electrical contact, or may be electrically conductively connected to the respective layer (e.g., the substrate sheet 106 or the third electrode 112(2)) by means of one or more other layers (e.g., a carbon layer). For example, the metal film 114 and the third electrode 112(112) may at least partially physically contact each other. An "at least partial" physical contact of two elements, as used herein, may be understood to mean that the two elements physically contact each other in at least one region (e.g., multiple regions). For example, multiple regions of the substrate sheet 106 may directly contact the metal film 114, and multiple other regions of the substrate sheet 106 may be disposed at a distance (e.g., a few μm or less than 1 μm) from the metal film 114 (e.g., filled with air).

The metal film 114 may reduce the contact resistance between the third electrode 112(2) of a winding and the second electrode 112(1) of the preceding winding. The reduced contact resistance may ensure that the cut-off frequency is greater than the desired maximum frequency of the speaker 100.

It will be understood that when the laminate 102 comprises the metal film 114, the thickness, t, of the laminate 102 may be substantially equal to the summed thickness of the substrate sheet 106 and the metal film 114, and that when the laminate 102 does not comprise the metal film 114, the thickness, t, of the laminate 102 may be substantially equal to the thickness of the substrate sheet 106.

According to various embodiments, the wound laminate 102 may be under a mechanical tension. Illustratively, a mechanical tension may be applied to the wound laminate 102. For example, the mechanical tension may result from the winding process. Illustratively, the laminate 102 may be wound under tension and this tension may induce the mechanical tension acting on the wound laminate 102. The mechanical tension may result in elongation (e.g., in the axial direction and/or radial direction) of the laminate 102. According to various embodiments, the stretching (also referred to as elongation) induced by the mechanical tension may be less than 50% (e.g., less than 20%; according to various embodiments, less than 10%). Illustratively, the size (in the axial direction and/or radial direction) of the stretched laminate 102 may be less than 1.5 times that of the non-stretched laminate 102 (i.e., if no mechanical tension were applied to the laminate 102). According to various embodiments, this comparatively low elongation may ensure that the rotary actuator 101 may produce both a size change in the axial direction and a size change in the radial direction upon actuation (see description with respect to FIG. 2A and FIG. 2B). Illustratively, a change in size in the axial direction and in the radial direction may be described as a full increase in volume. By means of the relationship between the stretching in the axial direction and the stretching in the radial direction, for example, the relationship of the proportion of axial radiation to the proportion of radial radiation (see description of FIG. 2A and FIG. 2B) may be adjusted, whereby, for example, the frequency range that may be generated may be modified. According to various embodiments, pre-expansion in the axial direction may be achieved by mechanical pre-expansion of the rotary actuator 101 during installation.

If the laminate 102 is wound in such a way that the laminate 102 in one winding physically contacts the laminate in the next winding, the number of windings, N, may be determined according to $$N = \frac{d_a - d_i}{t}.$$

The windings of the laminate 102 may be glued together. In this case, an adhesive may be arranged between the successive windings. The adhesive may, for example, be an electrically conductive adhesive. The adhesive may have a thickness, k. In this case, the number of windings, N, may be determined according to $$n = \frac{d_a - d_i}{t + k}.$$

It is understood that the thickness, k, for the innermost winding and the outermost winding are each to be subtracted.

Figure 1D:
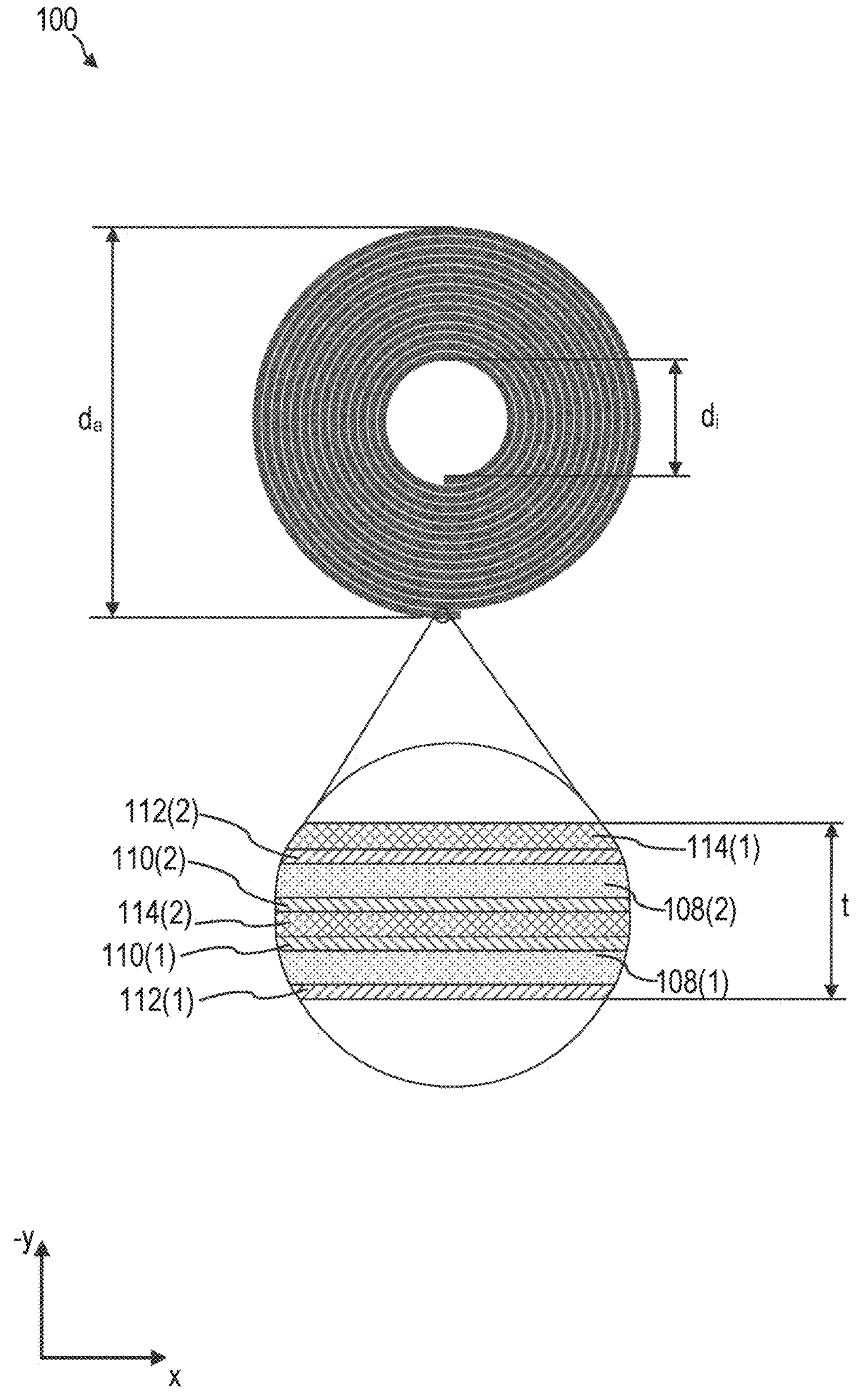

According to various embodiments, the metal film 114 may be a first metal film 114(1). With reference to FIG. 1D, the laminate 102 may further comprise a second metal film 114(2). The second metal layer 114(2) may be disposed between and electrically conductively connected to a first sub-layer 110(1) of the first electrode 110(1), 110(2) and a second sub-layer 110(2) of the first electrode 110(1), 110(2). Alternatively, the first electrode may comprise either the first sub-layer 110(1) or the second sub-layer 110(2). In this case, the second metal film 114(2) may be arranged in direct contact with the respective sub-layer and the first or second layer. The second metal film 114(2) may be configured as described above for the metal film 114 (i.e. the first metal film 114(1) in this example). Here, the first metal film 114(1) and the second metal film 114(2) may be configured in the same way (e.g. comprising the same material, the same thickness, etc.) or may be configured differently from each other.

Figure 1E:
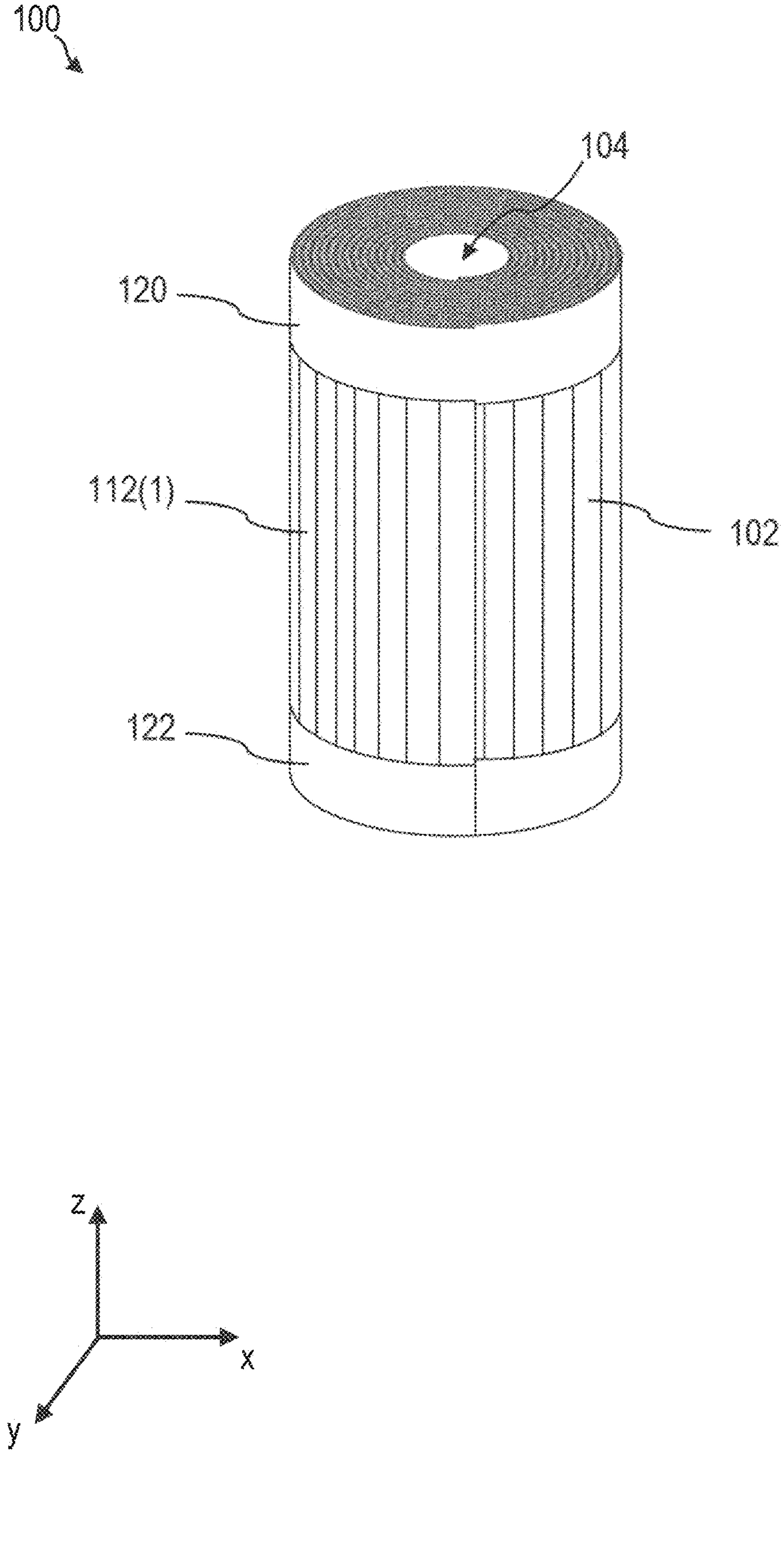

According to various embodiments, the first electrode 110(1), 110(2), the second electrode 112(1), and the third electrode 112(2) may completely cover the respective layer 108(1), 108(2). Alternatively, with reference to FIG. 1E, the first layer 108(1) and the second layer 108(2) may be free of the first electrode 110(1), 110(2), the second electrode 112(1) and/or the third electrode 112(2) in a first edge region 120 and/or a second edge region 122. Illustratively, for example, the first electrode 110(1), 110(2) may cover the first layer 108(1) and the second layer 108(2) only in a central region. Accordingly, for example, the second electrode 112(1) may cover the first layer 108(1) only in the center region and/or the third electrode 112(2) may cover the second layer 108(2) only in the center region. Consequently, the first edge region and/or the second edge region may be electrically insulating.

The edge regions 120, 122 may, for example, reduce (e.g., prevent) an acoustic short circuit (e.g., due to pressure equalization from the inside to the outside). For example, the edge regions 120, 122 may prevent an electrical short circuit due to ionized air. According to various embodiments, the edge regions may be used as waveguides. Due to a path extension of the sound, a positive interference to the radiated sound of the other side may occur when sound is emitted.

According to various embodiments, the wraps of the laminate 102 may be bonded together by adhesive in the first edge region 120 and/or the second edge region 122. According to various embodiments, the layers (e.g., sheets) of the laminate may be or may be directly cross-linked (e.g., by vulcanization) in the first edge region 120 and/or the second edge region 122.

The thickness of the first electrode 110(1), 110(2) may be substantially equal to the summed thickness of the second electrode 112(1) and the third electrode 112(2).

According to various embodiments, the modulus of elasticity of the dielectric elastomer of the first layer 108(1) and/or the second layer 108(2) may be in a region of about 100 kPa to about 10 MPa. For example, the dielectric elastomer may have a modulus of elasticity (Young's modulus) of about 1 MPa. According to various embodiments, the laminate 102 (optionally in combination with the metal film 114) may have an effective Young's modulus (a Young's modulus averaged over the respective volume of the layers/sheets) in a region of about 100 kPa to about 10 MPa.

Figure 1F:
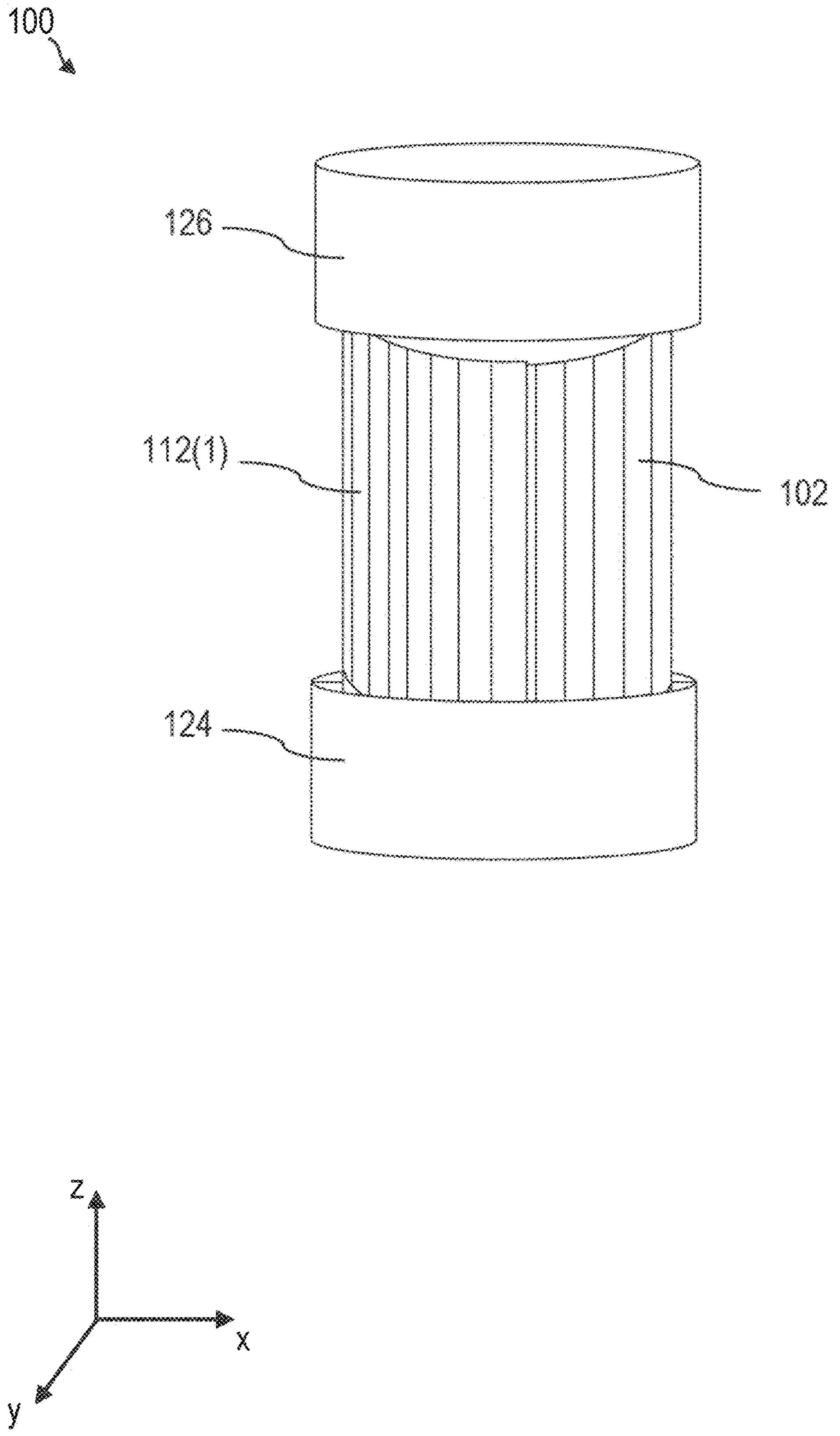

With reference to FIG. 1F, the speaker 100 may include a first cover cap 124 and a second cover cap 126. For example, the first cover cap 124 may be placed on (and optionally attached to) a first end face (e.g., base surface) of the rotary actuator 101 and the second cover cap 126 may be placed on a second end face (e.g., the top surface) of the rotary actuator 101. For example, the first cover cap 124 may cover the first end face and at least a portion of the second edge region 122 and the second cover cap 126 may cover the second end face and at least a portion of the first edge region 120. Illustratively, the first cover cap 124 and the second cover cap 126 may stabilize the wrapped laminate 102.

The bonding and/or the cover caps 124, 126 may increase the stiffness of the rotary actuator 101 and increase the usable bandwidth of the rotary actuator 101 as, for example, additional resonances may be usable. The first cover cap 124 and the second cover cap 126 may, for example, generate additional (for mechanics and/or acoustics) usable structural resonances (e.g. of the caps).

According to various embodiments, the rotary actuator 101 may comprise additional stiffening structures, such as one or more (e.g., helical) springs disposed in the cavity 104 and/or reinforcing/stiffening fibers wound with the laminate 102 (and optionally the first metal film 114(1) and/or the second metal film 114(2)).

In an exemplary embodiment of the laminate 102, the laminate 102 may be configured without a metal film 114. According to various embodiments of the laminate 102, a respective edge region of the first layer 108(1) and the second layer 108(2) may each be free of the first electrode 110(1), 110(2), the second electrode 112(1) or the third electrode 112(2). According to various embodiments, the first layer 108(1) and/or the second layer 108(2) may each comprise a textured surface in the normal direction (y or −y). A textured surface, as used herein, may be understood to comprise elevations and/or depressions in the normal direction. The structured surface may have a (e.g. regular) wave structure. The wave structure may, for example, reduce (e.g., decrease) a respective stretching of the first electrode 110(1), 110(2), the second electrode 112(1), and the third electrode 112(2). For example, the wave structure may create an anisotropy with respect to the surface stretching. Illustratively, the surface structure may be used to modify the elongation of the laminate 102, which in turn may lead to a modification of the radiation characteristics, as described herein.

Figure 1G:
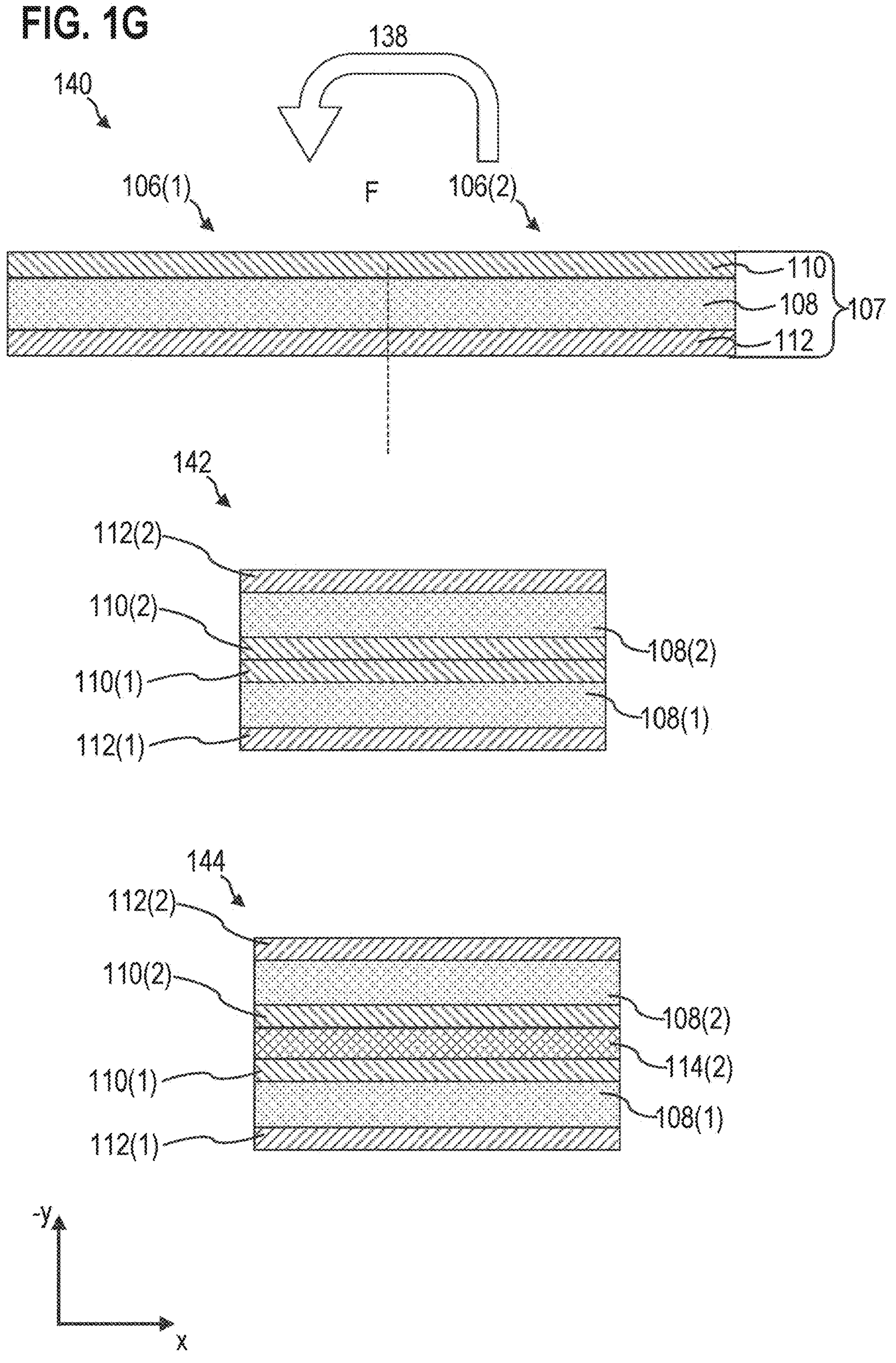

According to various embodiments, the substrate sheet 106 of the wrapped laminate 102 may be folded. FIG. 1G shows an unfolded state 140 (e.g., as part of the manufacturing process prior to folding). In the unfolded state 140, the substrate sheet 106 (in this case also referred to as the unfolded substrate sheet 107) may comprise a substrate layer 108 comprising or consisting of the dielectric elastomer. In the unfolded state 140, the substrate sheet 106 may further comprise a first electrode layer 110 disposed on a first side of the substrate layer 108. In the unfolded state 140, the substrate sheet 106 may further comprise a second electrode layer 112 arranged on a second side of the substrate layer 108 opposite the first side.

In the present example, the substrate sheet 106 may be folded in the center as indicated by the fold line, F. It will be understood that the substrate sheet 106 may be folded differently. The fold line, F, may divide the substrate sheet 106 into a first section 106(1) and a second section 106(2). FIG. 1G further shows an exemplary folded state 142 of the substrate sheet 106 (e.g., produced by folding at the fold line F in the folding direction 138). The substrate sheet 106 may be folded such that the first electrode layer 110 disposed in the first portion 106(1) and the first electrode layer 110 disposed in the second portion 106(2) at least partially touch each other. As shown, the first electrode layer 110 disposed in the first portion 106(1) and the first electrode layer 110 disposed in the second portion 106(2) may form the first electrode 110(1), 110(2). The second electrode layer 112 disposed in the first portion 106(1) may form the second electrode 112(1). The second electrode layer 112 disposed in the second portion 106(2) may form the third electrode 112(2). Illustratively, in the wound laminate 102 comprising the folded substrate sheet 106, an electrical short circuit between the first electrode layer 110 and the second electrode layer 112 may be prevented. According to various embodiments, the first electrode layer 110 may be formed only over the first portion 106(1) or the second portion 106(2), in which case the first electrode layer 110 also forms the first electrode 110(1), 110(2) after folding. According to various embodiments, the second electrode layer 112 may be formed only over the first portion 106(1) or the second portion 106(2), in which case the second electrode layer 112 forms the second electrode 112(1) or the third electrode 112(2) after folding. FIG. 1G further shows another exemplary folded state 144 of the substrate sheet 106 (e.g., produced by folding at the fold line F in the folding direction 138), wherein the substrate sheet 106 and the second metal film 114(2) may be folded around. The substrate sheet 106 may be folded around the second metal film 114(2) such that the first electrode layer 110 arranged in the first portion 106(1) at least partially contacts a first side of the second metal film 114(2), and such that the first electrode layer 110 arranged in the second portion 106(2) at least partially contacts a second side of the second metal film 114(2) opposite the first side. According to various embodiments, the first electrode layer 110 may be formed only over the first portion 106(1) or the second portion 106(2), in which case the respective portion of the first electrode layer 110 contacts the second metal film 114(2) after folding.

As an alternative to the folded substrate sheet 106 described above, the substrate sheet 106 may also comprise a first sheet and a second sheet, wherein the first electrode layer 110 may be arranged on the first side of the first sheet and on the first side of the second sheet, and wherein the first sheet and the second sheet are arranged on top of each other such that the first electrode layer 110 arranged over the first side of the first sheet and the first electrode layer 110 arranged over the first side of the second sheet are in contact. As described above, the second electrode layer 112 may form either the second electrode 112(1) or the third electrode 112(2), in which case the electrode disposed over the subsequent winding may form both electrodes, for example. According to various embodiments, the second metal film 114(2) may be disposed between the first sheet and the second sheet such that the first electrode layer contacts a respective side of the second metal film 114(2).

Figure 1H:
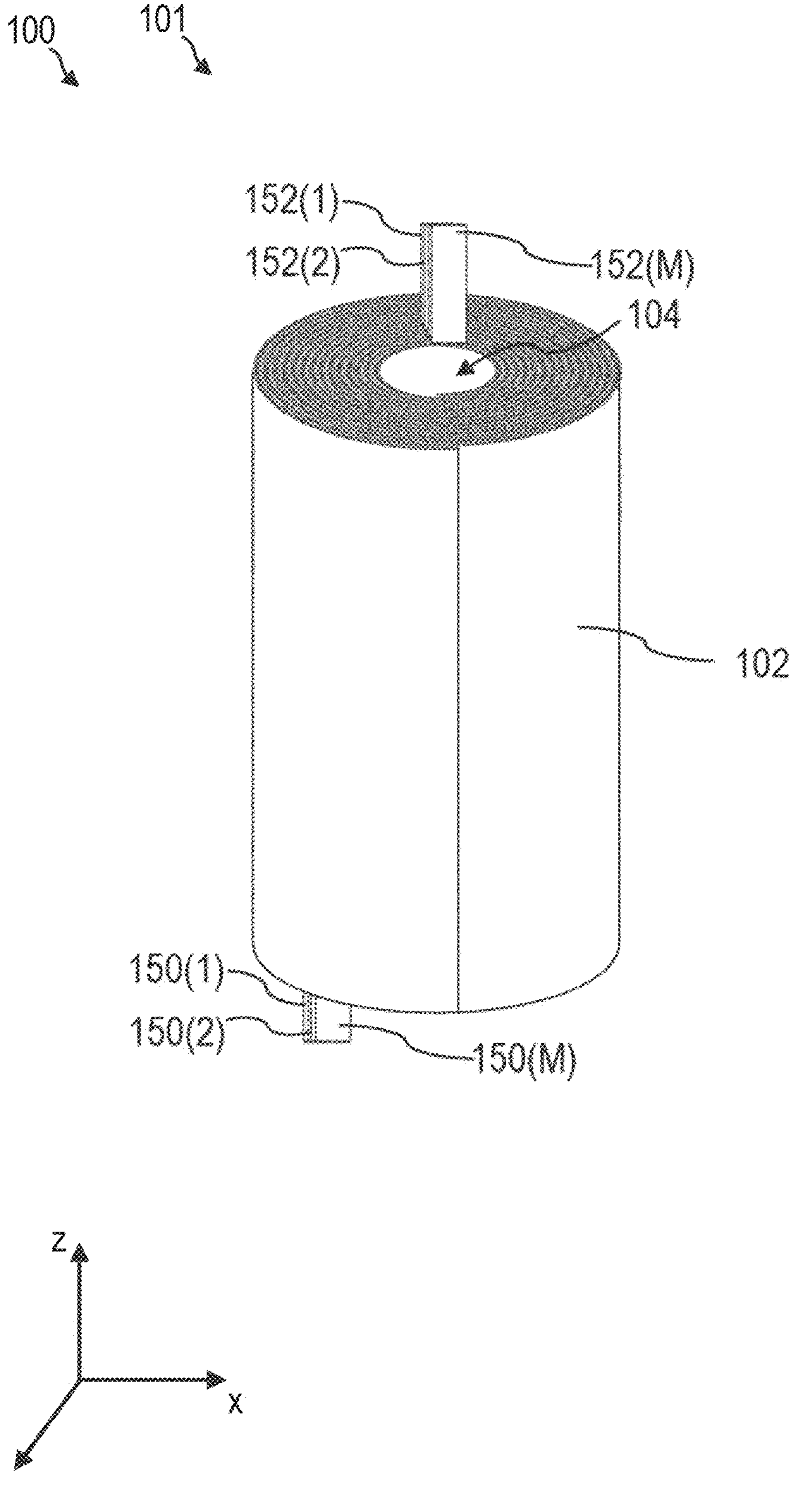

With reference to FIG. 1H, the wrapped laminate 102 may comprise the substrate sheet 106, the first metal film 114(1), and the second metal film 114(2). Optionally, the wound laminate 102 may comprise a plurality of first sheet portions 150 (m=1 to M) (where M may be any natural integer greater than or equal to "1") that electrically conductively contact the first metal film 114(1) and that extend out of the spiral cylindrical shape. For example, a first sheet portion 150 (*m*) may be arranged in each winding, n, of the N windings, so that the number of windings, N, may correspond to the number, M, of first sheet portions 150 (m=1 to M). This is exemplary and the wound laminate 102 may comprise any number, M, of first sheet portions 150 (m=1 to M). Each first sheet portion 150 (*m*) of the plurality of first sheet portions 150 (m=1 to M) may be electrically conductively connected to the first metal film 114(1). Illustratively, the led-out first sheet portions 150 (m=1 to M) may serve to electrically contact the first metal film 114(1). The plurality of first sheet portions 150 (m=1 to M) may be arranged substantially parallel to each other so that they may be electrically contacted together (see FIG. 1H). The first metal film 114(1) may be electrically conductively connected to the third electrode 112(2). Further, the first metal film 114(1) may be electrically conductively connected to the second electrode 112(1) of the subsequent winding. Consequently, the first metal film 114(1) in the wound laminate 102 may be electrically conductively connected to both the second electrode 112(1) and the third electrode 112(2). According to various embodiments, the second electrode 112(1) and the third electrode 112(2) may therefore be electrically contacted (e.g., jointly) by means of the first sheet portions 150 (m=1 to M). The first sheet portions 150 (m=1 to M) may protrude in the axial direction (z) over the base surface of the wrapped laminate 102 and/or over the top surface of the wrapped laminate 102.

According to various embodiments, each first sheet portion 150 (*m*) may comprise two sections which are joined together at least at one end. For example, these two sections may enclose the first metal film 114(1). For example, the first metal film 114(1) may be disposed between the two sections. Illustratively, each of the first sheet portions 150 (m=1 to M) may be arranged as a hook around the first metal film 114(1). The first sheet portions may be structurally pressed (e.g., embossed) with the first metal film.

According to various embodiments, the first sheet portions 150 (m=1 to M) may be made of the same material as the first metal film 114(1). According to various embodiments, the first sheet portions 150 (m=1 to M) may be part of the first metal film 114(1). For example, the first sheet portions 150 (m=1 to M) may be monolithically bonded to the first metal film 114(1).

According to various embodiments, the protruding ends of each first sheet portion 150 (*m*) may be T-shaped. This may improve contacting of the ends.

According to various embodiments, the wound laminate 102 may comprise a plurality of second sheet portions 152 (m=1 to M) (where M may be any natural integer greater than or equal to "1") which electrically conductively contact the second metal film 114(2) and which are led out of the spiral cylindrical shape. For example, a second sheet portion 152(*m*) may be arranged in each winding, n, of the N windings so that the number of windings, N, may correspond to the number, M, of second sheet portions 152 (m=1 to M). This is exemplary and the wrapped laminate 102 may comprise any number, M, of second sheet portions 152 (m=1 to M). Each second sheet portion 152(*m*) of the plurality of second sheet portions 152 (m=1 to M) may be electrically conductively connected to the second metal film 114(2). Illustratively, the led-out second sheet portions 152 (m=1 to M) may serve to electrically contact the second metal film 114(2). According to various embodiments, the first sheet portions may be led out on a first side (e.g., base surface or top surface) of the rotary actuator 101 and the second sheet portions may be led out on a side opposite the first side (e.g., top surface or base surface). This may simplify contacting of the first and second sheet portions. The arrangement of the second sheet portions may be similar to the arrangement of the first sheet portions described above, and the connection of the second sheet portions to the second metal film may be configured as described above for the connection of the first sheet portions to the first metal film. According to various embodiments, the second metal film 114(2) in the wound laminate 102 may be electrically conductively connected to the first electrode 110(1), 110(2) so that the first electrode 110(1), 110(2) may be electrically contacted by means of the second sheet portions 152 (m=1 to M).

As described herein, the first metal film 114(1) and the second metal film 114(2) may reduce the contact resistance between the respective electrodes. Parallelizing the electrodes and contacting them through the respective sheet portions may further reduce the contact resistance. This may, for example, lead to a homogenization of the phase propagation times (signal delays) that result due to the low-pass filter (e.g. in a differential RC network).

The cut-off frequency, $f_g$, results from $$f_g = \frac{1}{2\pi * R * C}.$$

According to various embodiments, the cut-off frequency, $f_g$, may be greater than 20 kHz, wherein the cut-off frequency, $f_g$, at the furthest point from the contact electrode is greater than the intended working frequency and wherein the cut-off frequency, $f_g$, is at least 1.2 times greater than the first axial resonance. According to various embodiments, this may be achieved by using the sheet portions described above).

Here, the electrical resistor generated by a natural oxide layer (e.g., aluminum oxide in the case of an aluminum layer as a metal layer) and the contact resistance (e.g., due to a low contact pressure due to elongation less than 50% and/or surface roughness) may be reduced. According to various embodiments, the first metal film 114(1) and/or the second metal film 114(2) may be embedded as a film grid (e.g., comprising a graphite mixture) in the respective electrode layer (e.g., in the first portion 106(1) and/or the second portion 106(2)). As described herein, the metal films are an exemplary embodiment of metal layers. According to various embodiments, the respective electrode layer (e.g., in the first portion 106(1) and/or the second portion 106(2)) may be covered (e.g., coated with the metal layer) by the associated metal layer.

Figure 2A:
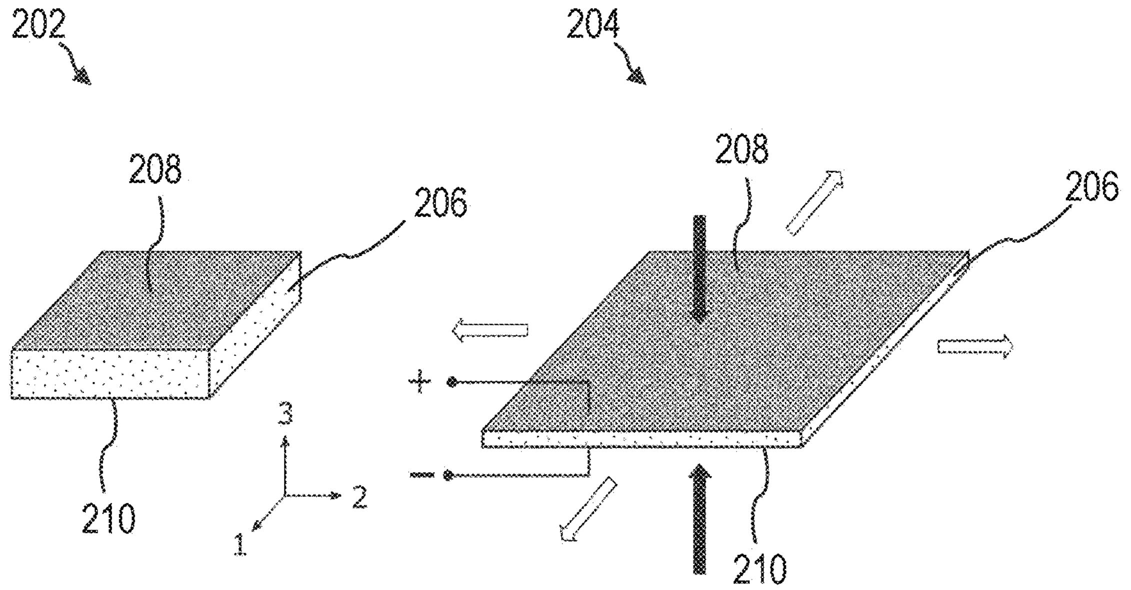
FIGS. 2A and 2B each show a schematic representation of the operating principle of the speaker according to various embodiments.

FIG. 2A schematically shows the functional principle for a planar layer 206, which comprises a dielectric elastomer. A first electrode layer 208 may be arranged over a first side of the planar layer 206, and a second electrode layer 210 may be arranged over a side of the planar layer 206 opposite the first side. View 202 shows the structure in a state in which no voltages are applied to the first electrode layer 208 and the second electrode layer 210. FIG. 204 shows the structure in a state in which a first voltage (e.g., "+") is applied to the first electrode layer 208 and a second voltage (e.g., "–") different from the first voltage is applied to the second electrode layer 210. This may result in an attraction between the first electrode layer 208 and the second electrode layer 210 (as shown by the filled arrows in FIG. 2A). This attraction between the first electrode layer 208 and the second electrode layer 210 may result in elastic deformation of the dielectric elastomer of the planar layer 206. This elastic deformation may result in an extent of the dielectric elastomer of the planar layer 206 in all directions parallel to the first electrode layer 208 and the second electrode layer 210 (as shown by the unfilled arrows in FIG. 2A). This may be a volume invariant compressibility. Illustratively, it may be seen that in this case there is no extent of the planar layer 206 perpendicular to the first electrode layer 208 and the second electrode layer 210, but the thickness of the planar layer 206 becomes smaller.

Figure 2B:
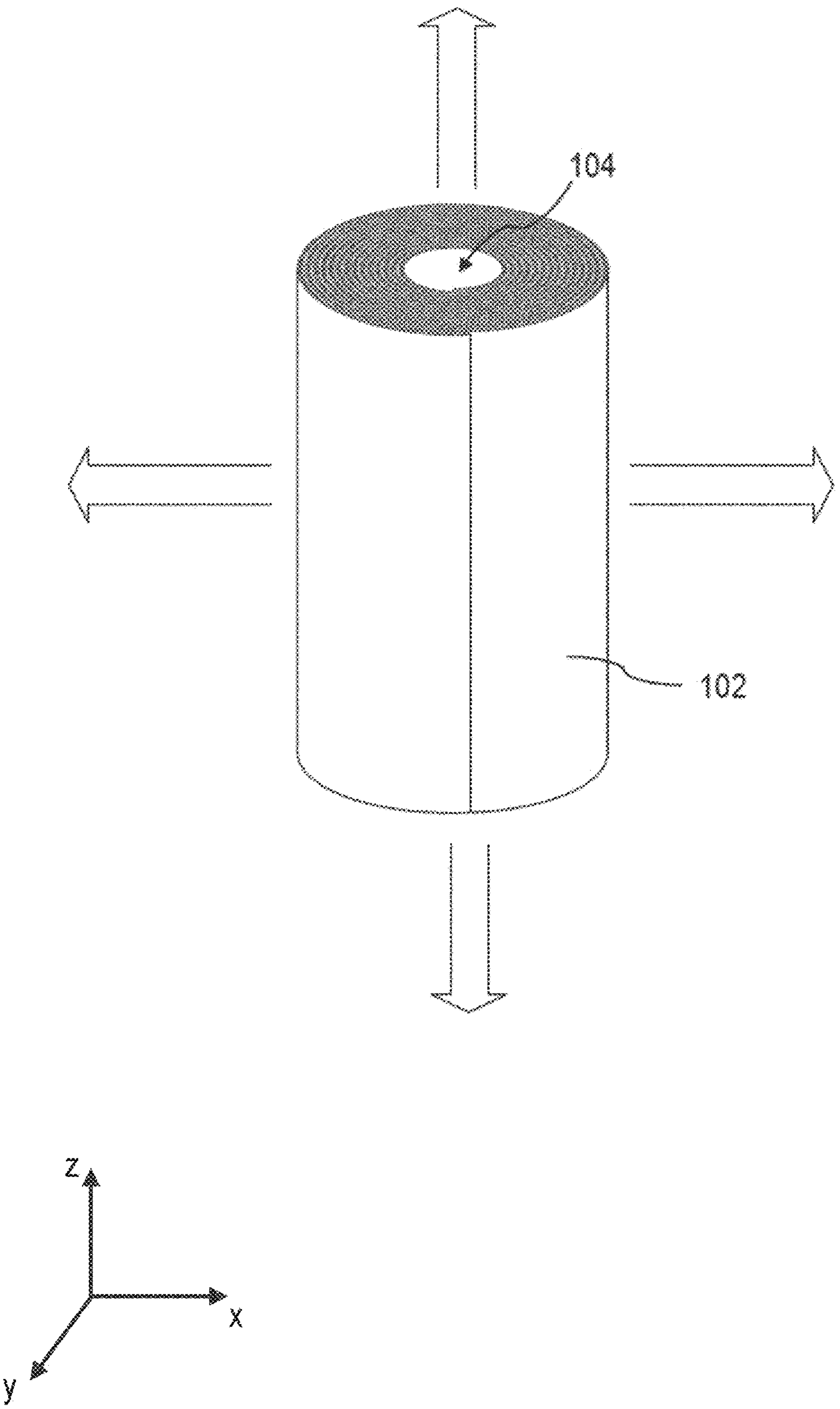

FIG. 2B schematically shows the operating principle for the rotary actuator 101 of the speaker 100 according to various embodiments.

The wound laminate 102 may be arranged (e.g., wound) such that when a first voltage is applied to the first electrode such that when a first voltage is applied to the first electrode 110(1), 110(2) and a second voltage different from the first voltage is applied to the second electrode 112(1) and the third electrode 112(2), the volume of the rotary actuator 101 increases in both the axial direction (z-direction) (referred to as axial direction in some aspects) and the radial direction (in x-direction and y-direction) (referred to as radial direction in some aspects) (as shown by the unfilled arrows in FIG. 2G). The increase in width may result in a larger circumference of the rotary actuator 101. Illustratively, the volume of the rotary actuator 101 may fully increase with applied stresses. According to various embodiments, the cavity 104 may allow for radial extent of the rotary actuator 101.

The magnitude of the first voltage and/or the second voltage may be in a region from about 0.1 kV to about 10 kV. According to various embodiments, the rotary actuator 101 may be operated at frequencies above the first fundamental resonance. For pressure chamber applications, the rotary actuator 101 may also be used at frequencies below the fundamental resonance (although these may be moved upward by design).

Depending on the dimensioning, the number of windings, the materials used, etc., the total capacitance of the rotary actuator may be in the region of approximately 0.5 nF (nanofarad) to approximately 500 nF (e.g. in the region of approximately 5 nF to approximately 125 nF). Larger regions are also possible with appropriate dimensioning.

According to various embodiments, the resizing in the radial direction and in the axial direction may be achieved by the elongation of the laminate 102 being less than 50%, as described herein. According to various embodiments, the first metal film 114(1) and/or the second metal film 114(2) may reduce the contact resistance to the respective electrodes so that the speaker 100 may achieve a high electrical cut-off frequency (e.g., greater than 20 kHz) despite the comparatively low elongation of the laminate 102 (and the resulting lower contact pressure of the windings of the laminate 102). The reduction of the contact resistance may further improve (i.e., increase) the efficiency by reducing thermal losses. Reducing actuator heating may increase the service life (e.g., lower breakdown risk) of the rotary actuator 101.

For example, the desired radial radiation of the speaker 100 may be achieved by having both the elongation of the laminate 102 in the axial direction and in the radial direction each be less than 50% and by having the metal film 114 may increase the contact resistance. In another example, the metal film 114 may be omitted and the elongation of the laminate 102 may be less than 20% (e.g., less than 10%) in both the axial direction and the radial direction.

The (electrical) tension-induced increase in the width, b, may be increased, for example, by the ratio of the outer diameter, $d_a$, to the inner diameter, $d_i$, of the wound laminate 102 being greater than or equal to 1.3 (e.g. greater than 2). The tension-induced increase in width, b, may be increased, for example, by using the first metal film 114(1) and/or the second metal film 114(2).

According to various embodiments, the magnification may be increased in a direction radially (i.e. in the radial direction) by increasing the number of windings (e.g. the number of layers).

The full increase in volume (i.e. volume displacement acting in the axial direction and in the radial direction) and the resulting flow of force may be used to generate acoustic signals. The increase in the axial direction and the increase in the radial direction occur in phase. Radiation is achieved by moving the respective surfaces in modes that are constructive (in phase) or act in separate frequency ranges to each other.

The amplitude (e.g. the force acting during volume displacement and/or the distance of the volume displacement) may be essentially proportional to the applied voltage. According to various embodiments, the charge carriers stored in the capacitive arrangement as a result of the application of a voltage may be recovered by means of recuperation. This may significantly increase the efficiency of the speaker 100. This is not possible with electrodynamic drivers, for example, as the amplitude of these is proportional to the applied current.

This illustratively shows how the rotary actuator 101 works and that it is suitable, for example, as a sound source driver. The rotary actuator 101 does not require any permanent magnets, so that, for example, no costs are incurred for rare earths (e.g. in the case of iron-neodymium-boron magnets). The rotary actuator 101 may be used as a sound-guiding element. The full volume increase (i.e. the radial volume increase in addition to the axial volume increase) enables radiation at a significantly larger radiation angle compared to electrodynamic drivers.

A speaker with the rotary actuator 101 described herein has several advantages over other speakers (e.g. speakers that use an electrodynamic driver):

- a reinforced mechanical-acoustic coupling,
- a higher sound pressure level in a superimposed frequency range with the same electrical power supply,
- improved linearity (e.g. frequency response and/or distortion factor) in the superimposed frequency range (in conjunction with signal pre-processing),
- a radiation in both axial and radial directions, whereby a homogeneous omnidirectional (e.g. hemispherical) radiation pattern is achieved,
- energy may be recovered through recuperation,
- less electrical energy is required in low-frequency regions,
- the rotary actuator 101 may be used as a tweeter without any other elements (e.g. surfaces of bodies),
- by means of the ratio of outer diameter to inner diameter and/or the mechanical tension acting on the laminate 102, the ratio of the proportion of axial radiation to the proportion of radial radiation may be adjusted, whereby, for example, the frequency range that may be generated may be extended.

According to various embodiments, a speaker may comprise the rotary actuator 101 and a vibratable body (referred to as a vibrating body in some aspects). The rotary actuator 101 may be disposed at least partially above the vibrating body in the direction of radiation of the speaker.

The term "at least partially above" the vibrating body, as used herein, may be understood to mean that at least 50 percent (e.g., volume percent) of the rotary actuator 101 is arranged above (i.e., in the direction of radiation above) the vibrating body in (the direction of radiation of the speaker that is perpendicular to) the vibrating body. Thus, the rotary actuator 101 may be moved translationally with respect to the vibrating body along the tangential axis in the direction of radiation in such a way that at least 50 percent of the rotary actuator 101 is arranged above the surface of the vibrating body.

For example, more than 90% of the rotary actuator 101 may be arranged above the vibrating body in the direction of radiation of the speaker. For example, the rotary actuator 101 may be arranged completely above the vibrating body.

Illustratively, the rotary actuator 101 may be arranged at least partially in the sound field of the speaker 300.

The vibrating body may be any type of body that may vibrate in response to a force acting on it to produce sound waves. For example, the vibrating body may be a movably mounted body. The movably mounted body may comprise at least one radiating surface. The vibrating body may, for example, comprise or be a speaker membrane, a vibrating plate (also referred to as a vibratable plate), a vibrating disk, etc.

Figure 3A:
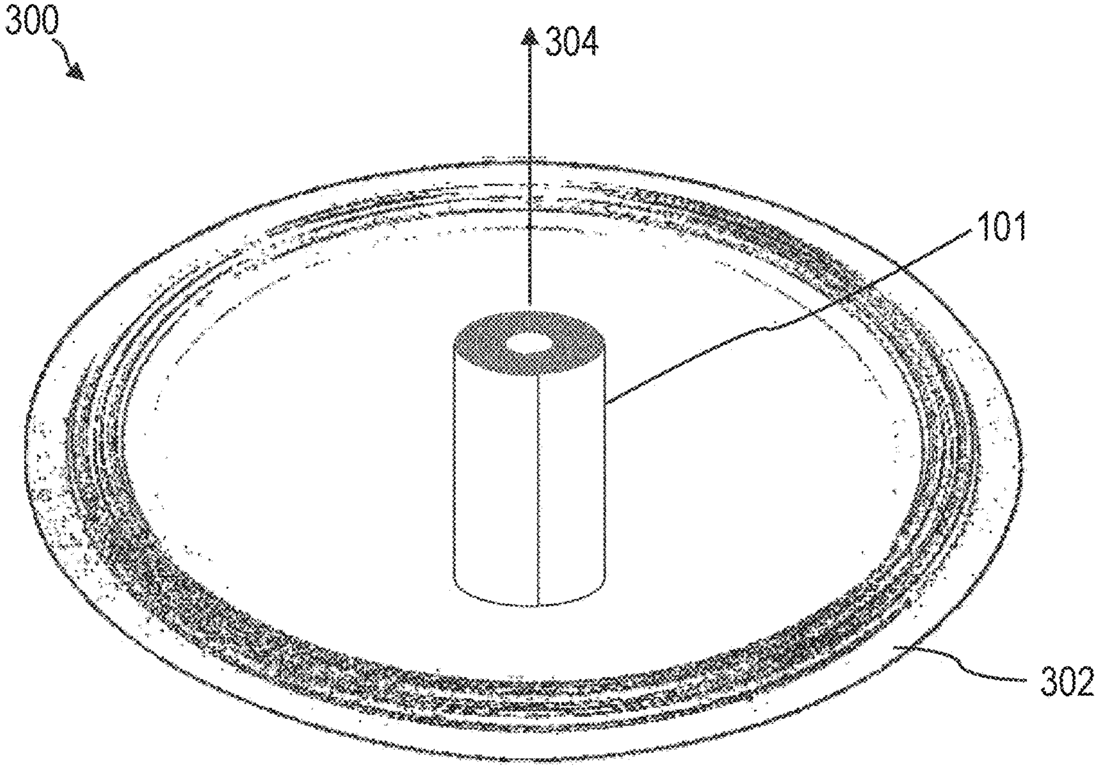
FIGS. 3A to 3C each show a speaker according to different embodiments.
Figure 3A:
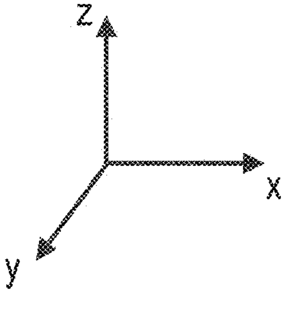
Figure 3B:
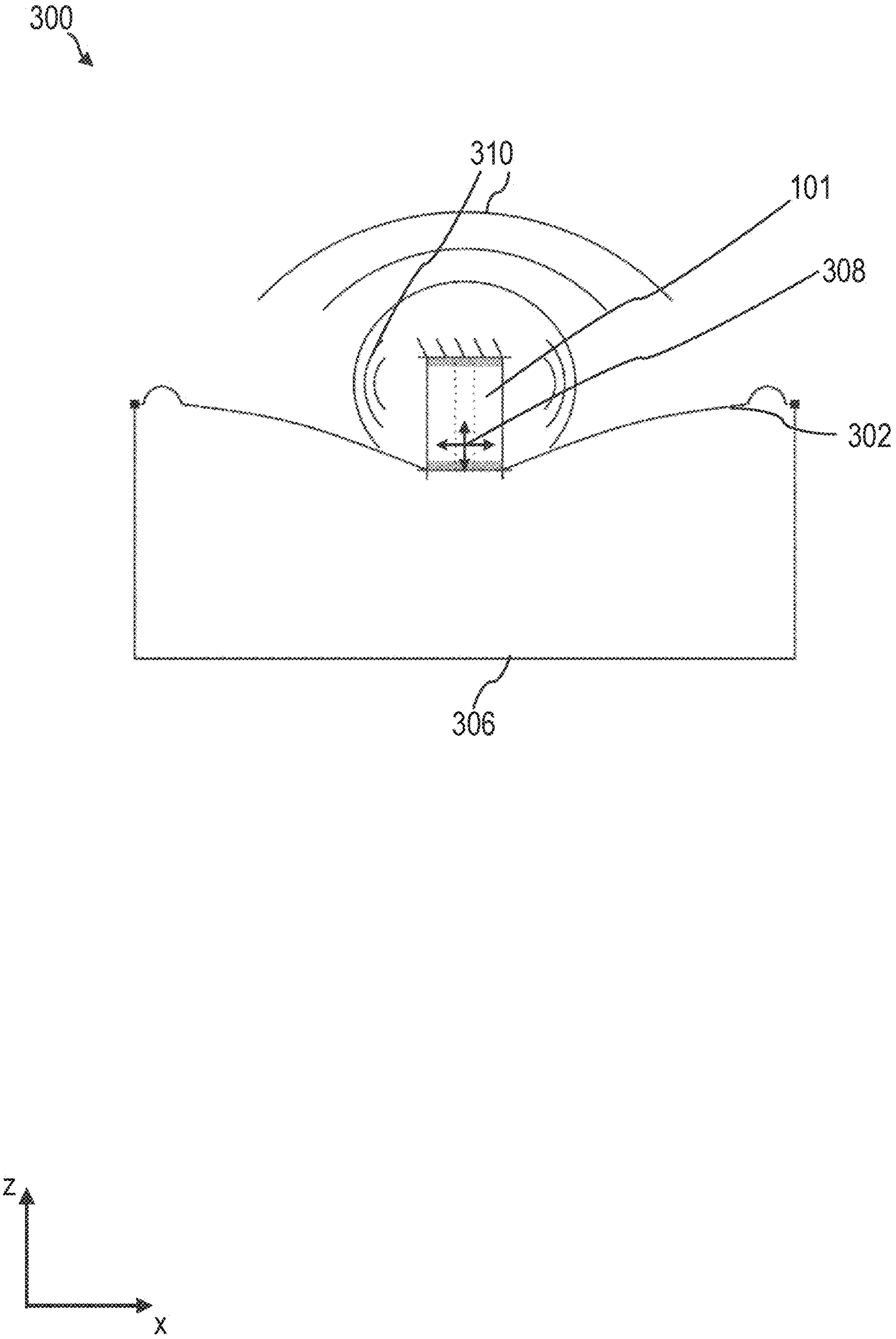
Figure 3C:
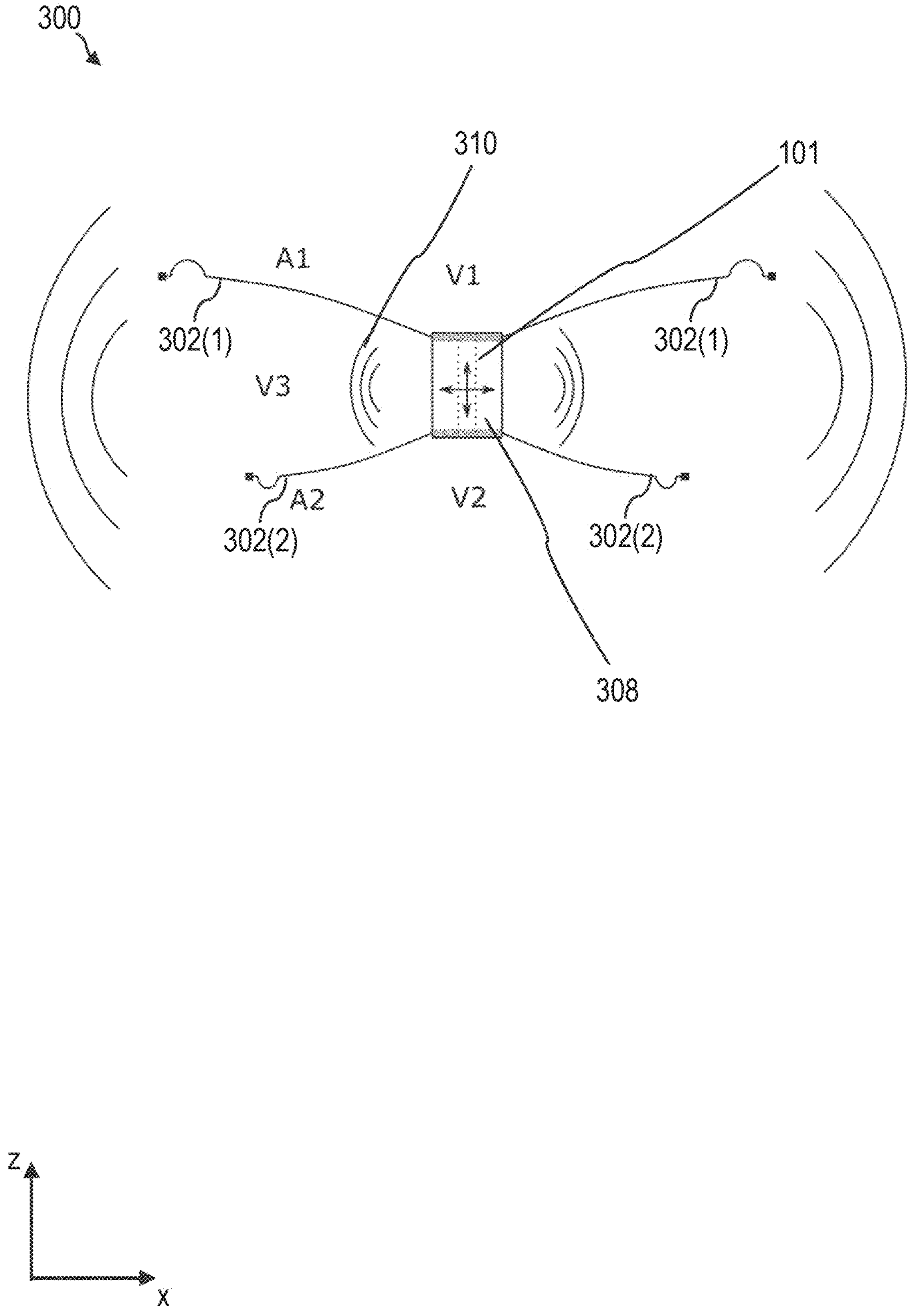

FIG. 3A, FIG. 3B and FIG. 3C each show a speaker 300 according to different embodiments. The speaker 300 may comprise the rotary actuator 101. The speaker 300 may comprise a speaker diaphragm 302. The speaker 300 may comprise a (e.g., center) dispersion direction 304. For example, the speaker cone 302 may be rotationally symmetric with respect to the (center) dispersion direction 304. According to various embodiments, the rotary actuator 101 may be arranged at least partially (e.g., completely) above the speaker diaphragm 302 in the radiation direction of the speaker 300.

As shown in FIG. 3A, the speaker diaphragm 302 may have the shape of a cone (e.g., be cone-shaped). The speaker diaphragm 302 may comprise a concave curved surface, and the rotary actuator 101 may be disposed at least partially over the concave curved surface in the radiating direction 304. For example, the speaker diaphragm 302 and the rotary actuator 101 may be arranged in direct physical contact with each other.

With reference to FIG. 3B, the speaker 300 may include a housing 306. The speaker diaphragm 302 may be suspended (e.g., movably) from the housing 306. The rotary actuator 101 may be at least partially (e.g., fully) disposed outside of the housing 306. The full circumferential increase in volume 308 of the rotary actuator 101 may generate full circumferential sound waves 310. Illustratively, a spherical radiation characteristic of the sound waves may be generated. For example, the housing 306 may prevent an acoustic short circuit. Acoustic short-circuiting may be understood as the reduction of sound radiation from vibrating surfaces (e.g. the speaker diaphragm 302) by direct pressure equalization between regions vibrating in opposite phase. This may lead to at least partial cancellation of radiated sound waves.

With reference to FIG. 3C, the speaker 300 according to various embodiments may include a first vibratable body 302(1) and a second vibratable body 302(2). For example, a first side of the rotary actuator 101 may be coupled to the first vibratable body 302(1) and a second side opposite the first side may be coupled to the second vibratable body 302(2). The first vibrating body 302(1) may comprise a first movable radiating surface A1. The second vibrating body 302(2) may comprise a second movable radiating surface A2. The vibrating body may be, for example, a speaker diaphragm, a bending wave transducer, etc. The first vibratable body and the second vibratable body 302(2) may be the same type of vibratable body (e.g., each a speaker diaphragm) or may be different types of vibratable bodies (e.g., the first vibratable body may be a speaker diaphragm and the second vibratable body may be a bending wave transducer, or vice versa). The first movable radiating surface A1 may have the same size as the second movable radiating surface A2 or the two surfaces A1, A2 may have different sizes. According to various embodiments, the sound radiation may take place in volume V3. The volume V1 and the volume V2 may each be separated from the volume V3 in such a way that no acoustic short circuit occurs. For example, connections such as bass reflex ports, waveguides, transmission lines, passive membranes, etc. are possible. According to various embodiments, the volume V1 and the volume V2 may be volumes of two separate chambers or may be part of a common chamber. For example, the two volumes V1, V2 may be connected to each other (e.g. by means of acoustic channels, resonators, acoustic masses, etc.). The volume V1 and the volume V2 may be the same size or may have different sizes (i.e. different volume values). This exemplary embodiment may be used, for example, to change the sound pressure level frequency response that may be generated, so that other (e.g. additional) resonances may be utilized.

It will be understood that the rotary actuator 101 may also be operated without additional surfaces (e.g., without the vibrating body). In this case, the inherent inertia of the rotary actuator 101 may be sufficient. In order to better utilize the force in the axial direction, a fixation of the rotary actuator 101, an inertial mass (a seismic mass) and/or a resiliently supported bearing may be used. According to various embodiments, an inherent inertia of the free side may be sufficient as an inertial mass when mounted on a flexible plate or membrane.

Figure 4A:
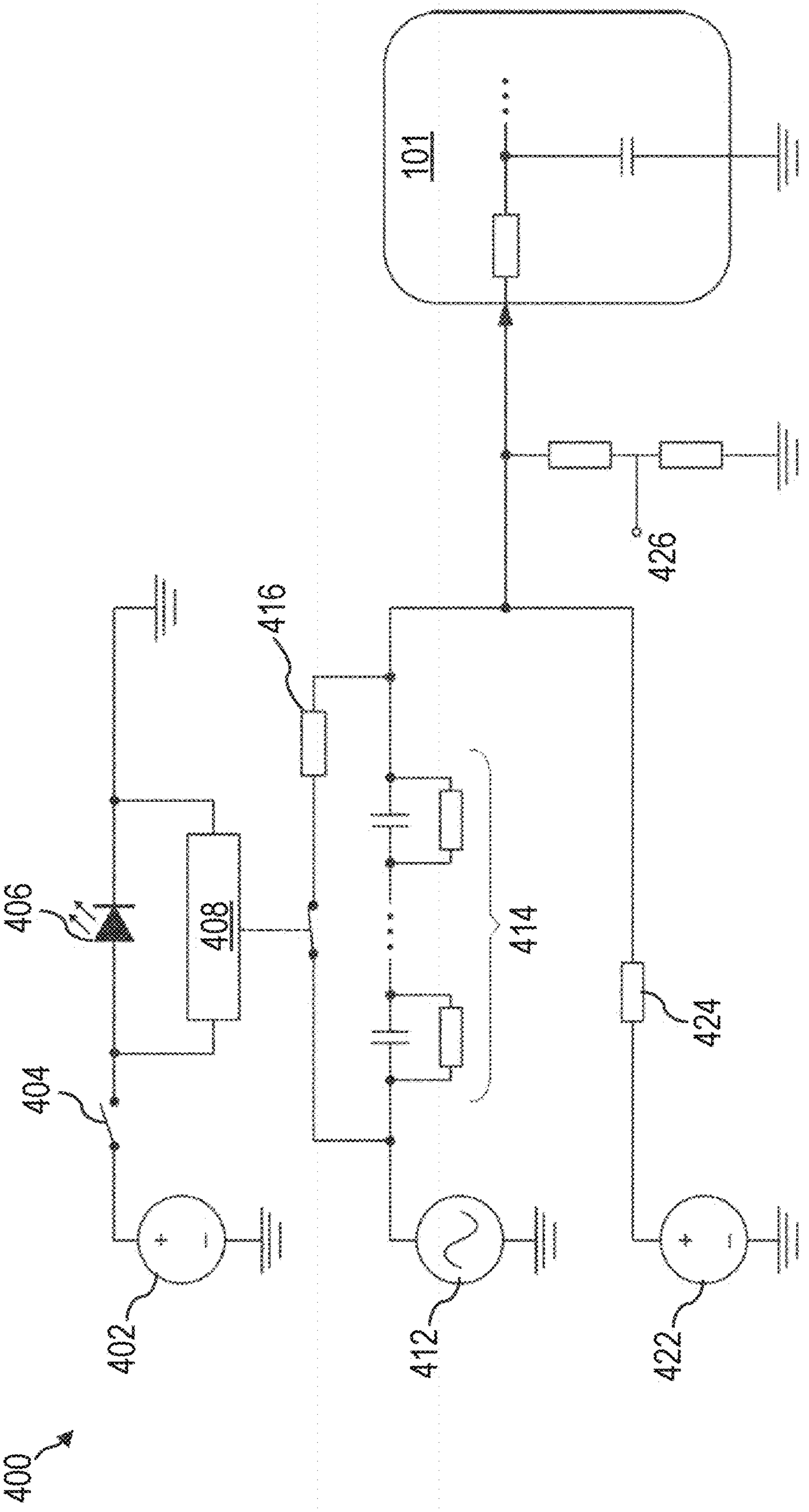
FIGS. 4A and 4B each show a circuit for dynamic control of a speaker according to various embodiments.
Figure 4B:
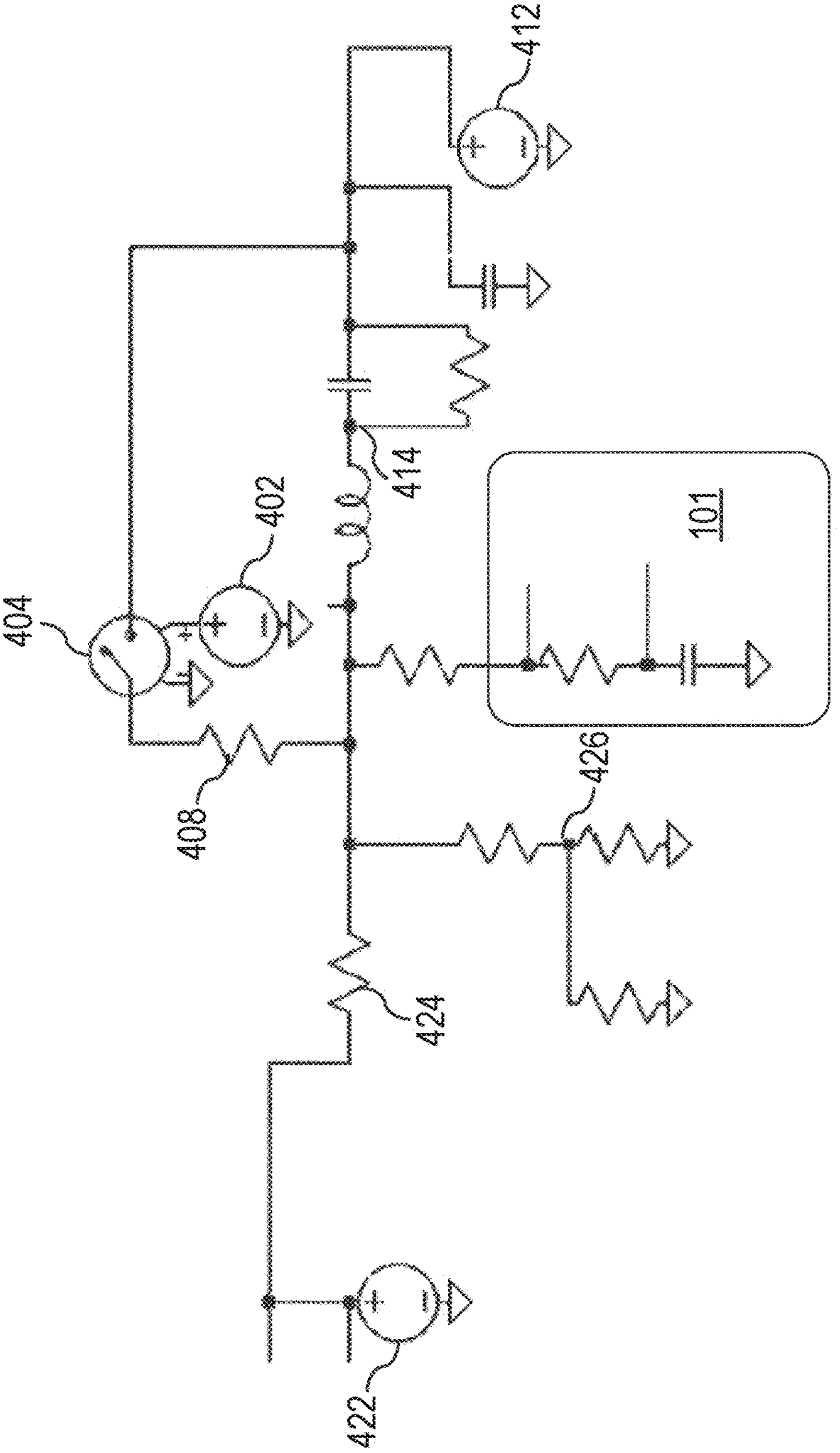

FIG. 4A and FIG. 4B each show an exemplary circuit 400 for (e.g., dynamically) controlling the rotary actuator 101 (e.g., the speaker 100 or the speaker 300).

The circuit 400 may comprise a direct current (DC) power supply 402. The circuit may comprise a relay 408 (referred to as a discharge resistor in some aspects). The relay 408 may be high-pulse resistant. The circuit 400 may comprise a switch 404 connected between the direct current (DC) power supply 402 and the relay 408. The circuit 400 may optionally comprise a light emitting diode (LED) 406 (referred to as a status LED in some aspects) connected in parallel with the relay 408, which may indicate status of the circuit 400 (e.g., ON or OFF).

The circuit 400 may comprise a high voltage alternating current (HV-AC) source 412. The high voltage alternating current (HV-AC) source 412 may be, for example, a piezoelectric amplifier. The circuit 400 may comprise a capacitor bank 414 coupled to the high voltage alternating current (HV-AC) source 412. The capacitor bank 414 may comprise one or more capacitors. The circuit 400 may comprise a bleeder resistor 416. The circuit 400 may comprise a high voltage direct current (HV-DC) source 422. The high voltage direct current (HV-DC) source 422 may, for example, be limited to a current of 0.5 mA. The circuit 400 may comprise a charging resistor 424 coupled to the high voltage direct current (HV-DC) source 422. The circuit 400 may comprise a monitoring output 426. For example, a monitoring device may be connected to the monitoring output 426 for monitoring the circuit 400. For example, the monitoring output 426 may provide selectable compensation for monitoring devices from a region of about 1 MΩ to about 10 MΩ.

The capacitor bank 414 may isolate (e.g., isolate) the high voltage alternating current (HV-AC) source 412 and the high voltage direct current (HV-DC) source 422 from each other. The capacitance of the capacitor bank 414 may be several times (e.g., more than one hundred times) greater than the capacitance of the rotary actuator 101.

The circuit 400 may comprise high-pulse-resistant lead resistors. This may enable fast and safe discharging, for example.

The driver of the rotary actuator 101 may require an adjustable polarization voltage, $U_{Dc}$, to enable bidirectional voltage-controlled movement. The capacitive and electrical low-pass behavior of the rotary actuator 101 may result in an increase in the required current with increasing frequency. For example, the circuit 400 may enable comparatively high polarization voltages (e.g., in a region from about 0.1 kV to about 10 kV) and amplified signals to be supplied with the required current (e.g., in a region from about 10 V to about 500 V, with currents up to several amperes, typically about 80 mA and 200 mA, respectively).

The circuit 400 may provide a substantially load-independent frequency response of the rotary actuator 101. According to various embodiments, the circuit 400 may generate a bias voltage (referred to as bias voltage in some aspects) up to 10 kV and an output current greater than 100 mA.

As described above, the rotary actuator 101 may also have an elliptical (e.g. circular) base formed by one or more layer stacks. In this case, the rotary actuator may be produced, for example, by forming the layers of the one or more layer stacks one after the other from the inside to the outside. For example, a layer may be laminated or produced by dip coating (also known as candle drawing). For example, the electrode layers may be produced by dip coating and the metal layer may be laminated as a metal film.

The following is an example of a manufacturing process for winding a laminate.

Figure 5:
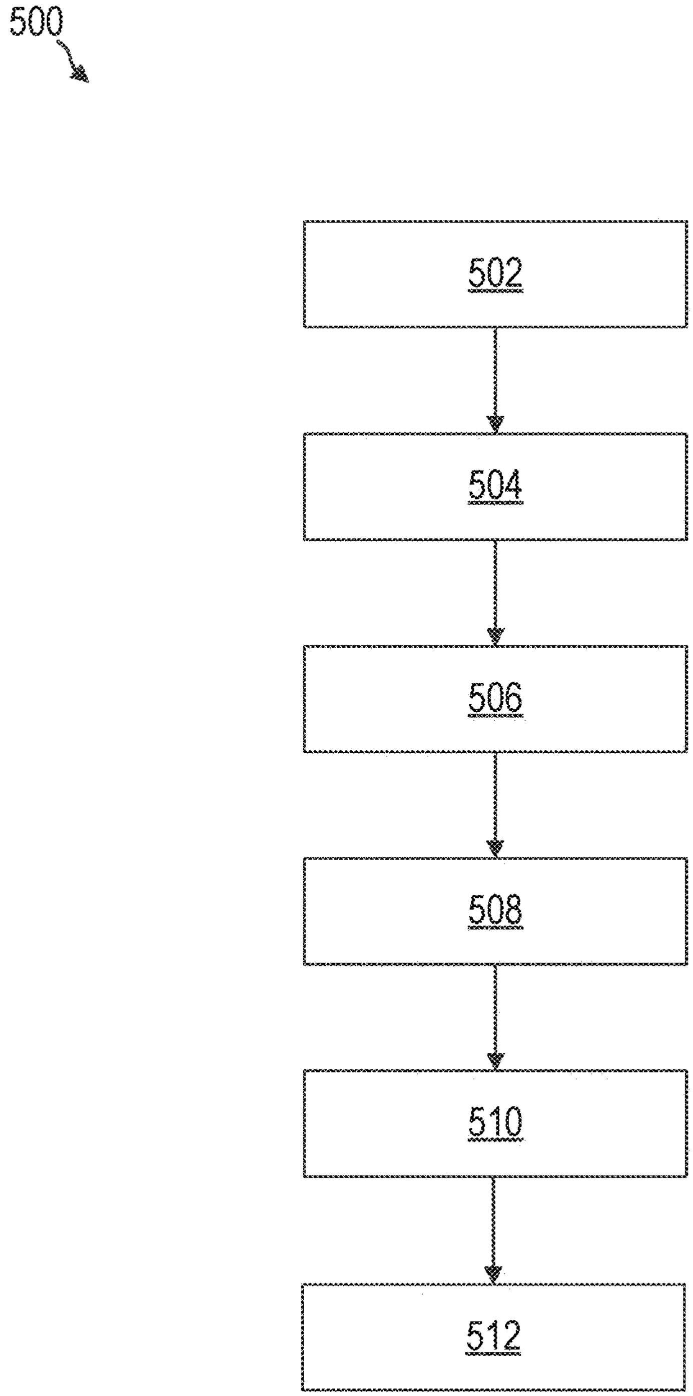
FIG. 5 shows a flowchart of a method of manufacturing a speaker according to various embodiments.
Figure 6:
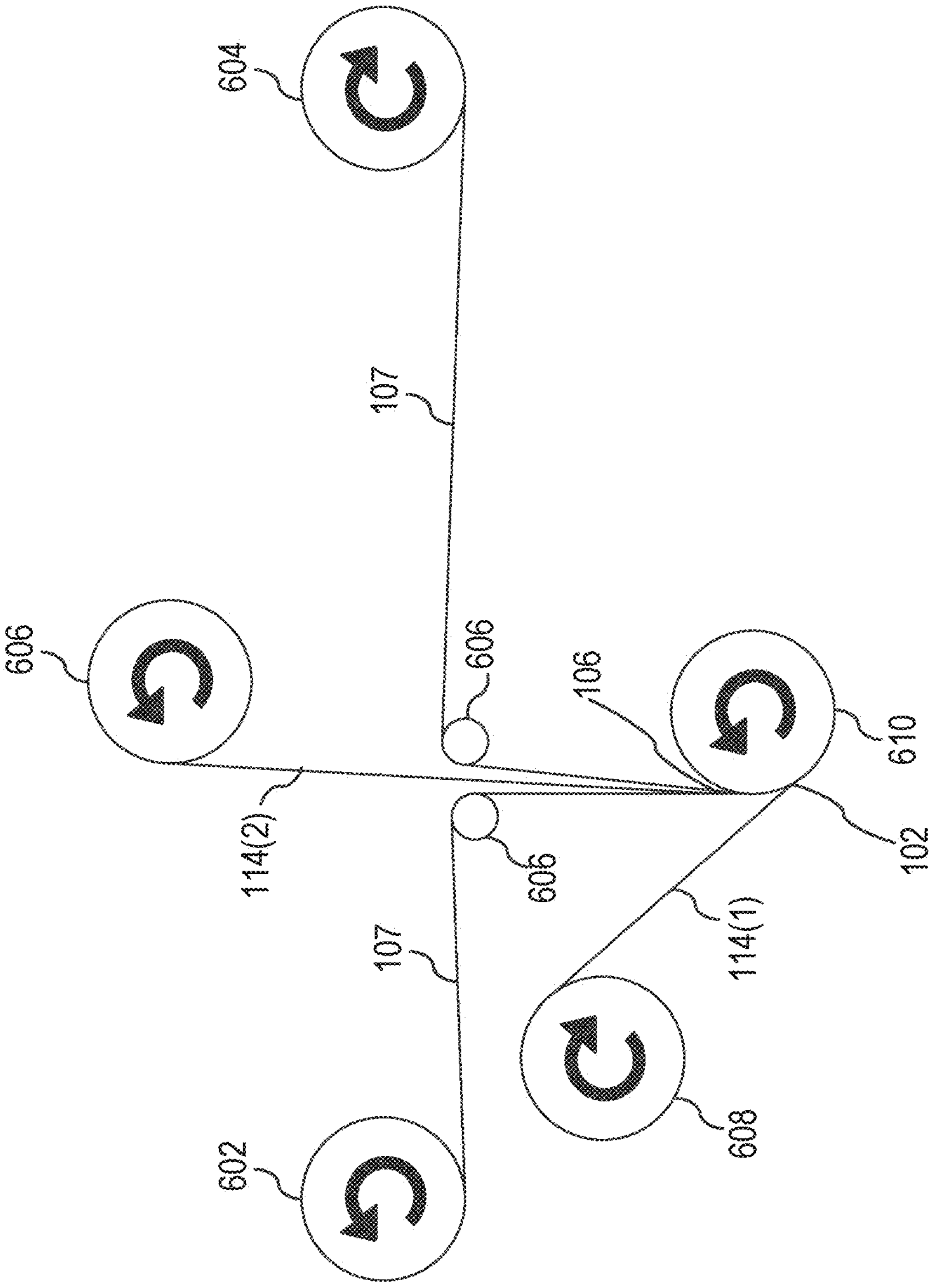
FIG. 6 shows a system for manufacturing a speaker according to various embodiments.

FIG. 5 shows a flowchart of a method 500 for manufacturing a speaker according to various embodiments. FIG. 6 shows an exemplary system 600 for manufacturing the speaker 100. For purposes of illustration, the method 500 is described with reference to the system 600 for the speaker 100. It will be understood that the method 500 may also be performed by a differently configured system.

The system 600 may comprise a control device, which may be configured to control the system 600 to execute the method 500. To this end, the control device may comprise one or more processors. The term "processor" may be understood as any type of entity that allows processing of data or signals. For example, the data or signals may be handled according to at least one (i.e., one or more than one) specific function performed by the processor. A processor may comprise or be formed from an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other type of implementation of the respective functions described in more detail below may also be understood as a processor or logic circuit. It will be understood that one or more of the method steps described in detail herein may be performed (e.g., realized) by a processor, through one or more specific functions performed by the processor. The processor may therefore be configured to perform the method described herein.

The method 500 may comprise coating a first side of a sheet with a first electrode material (in 502). The sheet may comprise or consist of a dielectric elastomer. The method 500 may comprise coating a second side of the sheet opposite the first side with a second electrode material (in 504).

The first electrode material and/or the second electrode material may be sprayed onto the sheet, for example. Alternatively, the sheet may be coated with the first electrode material and/or the second electrode material by means of screen printing. Further alternatively, the first electrode material and/or the second electrode material may be vapor-deposited onto the sheet.

As described herein, a first edge region 120 and/or second edge region 124 of the sheet may optionally be free of electrode material. For example, the first electrode material and/or the second electrode material may/may not be deposited on the sheet other than in the region located between the first edge region 120 and the second edge region 122. Alternatively, the first electrode material and/or the second electrode material may be removed after coating the sheet in the first edge region 120 and/or the second edge region 122. For example, the first electrode material and/or the second electrode material may be removed by etching (e.g., using nitric acid).

The method 500 may further comprise: rolling a first end of the sheet onto a first roll 602 and a second end of the sheet onto a second roll 604 such that a center region of the sheet is not rolled onto either the first roll 602 or the second roll 604 (in 506). According to various embodiments, the first side of the sheet may be coated with the first electrode material prior to rolling. Alternatively, the first side of the sheet may be coated with the first electrode material after the sheet is rolled up (e.g., as part of the unwinding process during rolling onto the fifth roll 610). Accordingly, the second side of the sheet may be coated before or after rolling. According to various embodiments, the sheet may also be coated during the rolling process.

The method 500 may further comprise: folding the center region of the coated sheet around a second metal film 114(2) unwound from a third roll 606 such that the first electrode material arranged over a first portion of the sheet contacts a first side of the second metal film, and such that the first electrode material arranged over a second portion of the sheet contacts a second side of the second metal film opposite the first side (in 508). For example, the sheet may be the substrate layer 108, which is coated with the first electrode material to form the first electrode layer 110 and which is coated with the second electrode material to form the second electrode layer 112. Subsequently, the sheet (in this case, for example, the unfolded substrate sheet 107) may be folded around the second metal film 114(2) as shown in FIG. 1G and described with reference thereto (see FIG. 144).

The method 500 may comprise (in 510) bringing together a side of the sheet (e.g., substrate sheet 106) folded around the second metal film 114(2) and a side of a metal film (e.g., the first metal film 114(1)) unwound from a fourth roll 608 to form a laminate (e.g., the laminate 102).

Optionally, an additional plurality of other rolls 606 may be used. The folded sheet and the first metal film 114(1) may be brought together such that they are electrically conductively connected to each other.

The method 500 may comprise winding the laminate (e.g., to produce the wound laminate 102) onto a fifth roll 610 by unwinding the sheet from the first roll 602 and the second roll 604, by unwinding the second metal film 114(2) from the third roll 606, and by unwinding the first metal film 114(1) from the fourth roll (in 512). The winding tension during winding of the laminate onto the fifth roll 610 may be selected (e.g., depending on the material of the laminate and optionally the first metal film 114(1) or the second metal film 114(2)) such that an elongation of the wound laminate in the axial direction is less than 50% (e.g. less than 20%; according to various embodiments less than 10%).

The method 500 enables the (e.g., non-stretchable) metal sheet to be wound together with the stretchable folded sheet (e.g., the stretchable substrate sheet coated with electrode material) such that reduced (e.g., substantially no) mechanical stresses occur between them in the (e.g., vertical) roll assembly.

Optionally, the method 500 may further comprise separating the wound laminate and the third roll 608. For example, the third roll 608 may be separable into at least two parts and may be removed from within the wrapped laminate. Illustratively, the removal of the third roll 608 may form the cavity 104. The wound laminate 102 with the cavity 104 may form the rotary actuator 101. Optionally, the method 500 may further comprise: arranging the rotary actuator 101 on a vibratable body (e.g., the speaker diaphragm 302 to form the speaker 300).

It will be understood that aspects described with reference to the speaker 100 or 300 may also be embodied as methods of making these configurations, and vice versa.

The speaker 100, 300 with the rotary actuator 101 described herein may be used, for example, in the aerospace industry (e.g., in airplanes and/or at airports as a speaker for announcements by airplane personnel), in public transportation (e.g., in buses and/or at bus stops as a speaker for announcements), in the vicinity of a magnetic resonance imaging (MRI) scanner (e.g., as headphones which may be used in an MRI scanner), in museums, for building sound reinforcement, etc. Since the rotary actuator 101 according to various embodiments comprises no (ferro) magnetic and/or no ferroelectric components, it may advantageously be used in the vicinity of MRIs. This may also significantly reduce the mass of the speaker so that, for example, fuel may be saved in buses, trains, airplanes, etc. The speaker described herein also places low demands on the raw materials required. According to various embodiments, the speaker described herein may have a significantly higher efficiency compared to conventional speakers (especially if power electronics with charge recuperation are used).

It will be understood that the concept of full-volume increase (referred to in some aspects as volume expansion) described herein is described for illustrative purposes for the speaker application only, and that the rotary actuator 101 is also suitable as an actuator for other applications, such as an actuator for a pump (e.g., a microfluidic pump), as an actuator of a robot (e.g., in soft robotics), or other applications in which a voltage-induced full-volume increase is advantageous.

Examples illustrating embodiments of the concept of full volume increase are described below.

Example 1 is a speaker comprising: a rotary actuator comprising a wound laminate, the laminate comprising a first layer and a second layer each comprising or consisting of a dielectric elastomer, a first electrode disposed between the first layer and the second layer in direct contact therewith; a second metal layer disposed between a first sub-layer of the first electrode and a second sub-layer of the first electrode and electrically conductively connected thereto; a second electrode disposed on a side of the first layer that is distal from the first electrode and in direct contact with the first layer; a third electrode disposed on a side of the second layer that is distal from the first electrode and in direct contact with the second layer; and a first metal layer (e.g., aluminum layer) that is electrically conductively connected to the third electrode (e.g. by means of a carbon layer).

Example 2 is a speaker comprising: a rotary actuator comprising a wound laminate, the laminate comprising a substrate sheet and a first metal film, the substrate sheet comprising a first layer and a second layer each comprising or consisting of a dielectric elastomer, a first electrode disposed between the first layer and the second layer in direct contact therewith, a second metal film disposed between a first sub-layer of the first electrode and a second sub-layer of the first electrode and electrically conductively connected thereto; a second electrode disposed on a side of the first layer distal from the first electrode and in direct contact with the first layer, and a third electrode disposed on a side of the second layer distal from the first electrode and in direct contact with the second layer, wherein the substrate sheet and the first metal film are wound in such a manner that when a first electric voltage is applied to the first electrode and a second electric voltage different from the first electric voltage is applied to the second electrode and the third electrode, a length of the rotary actuator in the axial direction and a width of the rotary actuator in the radial direction become larger.

Example 3 is configured according to one of examples 1 or 2, wherein a mechanical tension acting on the laminate induces an elongation of the laminate, wherein the elongation is less than 100% (e.g. less than 50%).

Example 4 is configured according to any one of examples 1 to 3, wherein the second metal layer is a second metal film, and wherein the laminate comprises a folded substrate sheet having in an unfolded state a substrate sheet comprising or consisting of the dielectric elastomer, a first electrode layer arranged on a first side of the substrate sheet and in direct contact with the substrate sheet, and a second electrode layer arranged on a second side of the substrate sheet opposite the first side and in direct contact with the second side of the substrate sheet, wherein the substrate sheet is folded in such a way (e.g. centrally) so that the first electrode layer arranged on a first portion (e.g. one half) of the substrate sheet touches a first side of the second metal film and so that the first electrode layer arranged on a second portion (e.g. the other half) of the substrate sheet touches a second side of the second metal film arranged opposite the first side, so that: the first electrode layer forms the first electrode, the first portion of the substrate sheet forms the first layer, the second electrode layer arranged on the first portion of the substrate sheet forms the second electrode, the second portion of the substrate sheet forms the second layer, and the second electrode layer arranged on the second portion of the substrate sheet forms the third electrode.

Example 5 is configured according to any one of examples 1 to 4, wherein the first metal layer (also referred to as metallic layer) is a first metal film and/or wherein the second metal layer is a second metal film.

Example 6 is configured according to one of examples 1 to 5, wherein the wound laminate comprises in each winding at least one first sheet portion which is electrically conductively connected to the first metal layer and projects in the axial direction of the rotary actuator beyond one end of the first layer and the second layer in such a way that the first metal layer in each winding of the wound laminate may be contacted in an electrically conductive manner by means of the first sheet portions; and/or wherein the wound laminate comprises at least one second sheet portion in each winding, which is electrically conductively connected to the second metal layer and extends in the axial direction of the rotary actuator over one end of the first layer and of the second layer (e.g. an end of the first layer and of the second layer). (e.g. an end opposite the first sheet portions) in such a way that the second metal layer in each winding of the wound laminate may be contacted in an electrically conductive manner by means of the second sheet portions.

Example 7 is a speaker according to examples 5 and 6, wherein the first metal film comprises the first sheet portions and/or wherein the second metal film comprises the second sheet portions.

Example 8 is configured according to example 7, wherein the first metal film and the first sheet portions are formed from the same material and/or wherein the second metal film and the second sheet portions are formed from the same material.

Example 9 is a speaker according to any one of examples 6 to 8, wherein the distances between two successive first sheet portions in a developed state of the wound laminate are substantially equal and/or wherein the distances between two successive second sheet portions in a developed state of the wound laminate are substantially equal.

Example 10 is configured according to any one of examples 6 to 9, wherein the first sheet portions are arranged substantially parallel to each other and/or wherein the second sheet portions are arranged substantially parallel to each other.

Example 11 is a speaker according to any one of examples 1 to 10, wherein the wrapped laminate encloses a cavity.

Example 12 is configured according to any one of examples 1 to 11, wherein the number of windings of the wound laminate is greater than or equal to two.

Example 13 is a speaker comprising: a multi-layered hollow cylindrical rotary actuator comprising one or more layer stacks arranged substantially concentrically with the shell surface of the rotary actuator, each of the one or more layer stacks comprising a first layer and a second layer, each comprising or consisting of a dielectric elastomer; a second metal layer disposed between the first layer and the second layer; a first electrode layer disposed between and in direct contact with the first layer and the second metal layer; a fourth electrode layer disposed between and in direct contact with the second layer and the second metal layer; a second electrode layer disposed on a side of the first layer that is distal from the first electrode layer and in direct contact with the first layer; a third electrode layer disposed on a side of the second layer that is distal from the fourth electrode layer and in direct contact with the second layer; and a first metal layer (e.g., aluminum layer) that is electrically conductively connected to the third electrode layer (e.g. by means of a carbon layer).

Example 14 is configured according to example 13, wherein the respective metal layer of the one or more layer stacks is a metal film.

Example 15 is a speaker according to one of examples 13 or 14, wherein each of the one or more layer stacks further comprises at least one sheet portion which is electrically conductively connected to the metal layer and protrudes in the axial direction of the rotary actuator beyond one end of the first layer and the second layer in such a way that the respective metal layer of each layer stack may be electrically conductively contacted by means of the at least one sheet portion.

Example 16 is configured according to examples 14 and 15, wherein the respective metal film comprises the at least one sheet portion.

Example 17 is configured according to example 16, wherein the respective metal film and the at least one sheet portion are formed from the same material.

Example 18 is a speaker according to any one of examples 15 to 17, wherein the rotary actuator comprises the plurality of layer stacks and wherein the sheet portions are arranged substantially parallel to each other.

Example 19 is configured according to one of examples 1 to 18, wherein the respective metal layer comprises or consists of aluminum.

Example 20 is configured according to one of examples 1 to 19, wherein the electrical resistance of the respective metal layer is less than or equal to 30.106 S/m, and/or wherein the density of the respective metal layer is less than or equal to 3 g/cm$^3$ Example 21 is configured according to any one of examples 1 to 20, wherein the metal layer comprises a thickness in a region of about 0.1 μm to about 100 μm (e.g., about 12 μm).

Example 22 is a speaker comprising: a vibratable body, a rotary actuator comprising a wound sheet, the sheet comprising: a first layer and a second layer, each comprising or consisting of a dielectric elastomer; a first electrode disposed between the first layer and the second layer in direct contact therewith; a second electrode disposed on a side of the first layer distal from the first electrode and in direct contact with the first layer; and a third electrode, which is arranged on a side of the second layer distal to the first electrode and in direct contact with the second layer; wherein the rotary actuator is arranged at least partially above the vibrating body in the direction of radiation of the speaker.

Example 23 is configured according to example 22, wherein the wrapped sheet encloses a cavity.

Example 24 is a speaker according to any one of examples 22 or 23, wherein the number of windings of the wound sheet is greater than or equal to two.

Example 25 is configured according to any one of examples 22 to 24, wherein the sheet comprises a folded substrate sheet comprising, in an unfolded state, a substrate layer comprising or consisting of the dielectric elastomer, a first electrode layer arranged on a first side of the substrate sheet and in direct contact with the substrate layer, and a second electrode layer arranged on a second side of the substrate sheet opposite the first side and in direct contact with the second side of the substrate layer, wherein the substrate sheet is folded (e.g. centrally) such that the first electrode layer arranged on a first portion (e.g. one half) of the substrate sheet touches the second electrode layer arranged on a second portion (e.g. the other half) of the substrate sheet, so that: the first electrode layer forms the third electrode, the first portion of the substrate sheet forms the first layer, the second electrode layer arranged on the first portion of the substrate sheet forms the second electrode, the second portion of the substrate sheet forms the second layer, and the second electrode layer arranged on the second portion of the substrate sheet forms the third electrode.

Example 26 is a speaker comprising: a vibratable body; a multilayer hollow cylindrical rotary actuator comprising one or more layer stacks arranged substantially concentrically with the shell surface of the rotary actuator, each of the one or more layer stacks comprising a first layer and a second layer, each comprising or consisting of a dielectric elastomer; a first electrode layer disposed between the first layer and the second layer in direct contact therewith; a second electrode layer disposed on a side of the first layer distal from the first electrode layer and in direct contact with the first layer; and a third electrode layer, which is arranged on a side of the second layer distal to the first electrode layer and in direct contact with the second layer; wherein the rotary actuator is arranged at least partially above the vibrating body in the direction of radiation of the speaker.

Example 27 is configured according to any one of examples 22 to 26, wherein the vibrating body is a speaker diaphragm.

In example 28, the speaker according to example 27 may optionally further comprise: a speaker housing, wherein the speaker cone is suspended (movably attached) by means of the housing.

Example 29 is configured according to example 27 or 28, wherein the speaker cone has a concave curved surface (e.g. is cone-shaped), wherein the rotary actuator (in the direction of radiation of the speaker) is arranged on the concave curved surface of the speaker cone (e.g. is arranged in direct contact with the concave curved surface).

Example 30 is configured according to any one of examples 1 to 29, wherein the dielectric elastomer comprises an acrylate, a silicone, natural rubber or a polyurethane.

Example 31 is configured according to one of examples 1 to 30, wherein the dielectric elastomer comprises a modulus of elasticity between 100 kPa and 10 MPa (e.g. approximately 1 MPa), and/or wherein the laminate or the one or more layer stacks comprises an effective modulus of elasticity between 100 kPa and 10 MPa (e.g. approximately 1 MPa).

Example 32 is configured according to any one of examples 1 to 31, wherein the ratio of (e.g. maximum) outer diameter of the rotary actuator to (e.g. minimum) inner diameter of the rotary actuator is greater than or equal to two.

Example 33 is configured according to any one of examples 1 to 32, wherein the first electrode or first electrode layer, and/or the second electrode or second electrode layer, and/or the third electrode or third electrode layer comprises or consists of: silver, silicone comprising carbon black particles, or silicone comprising carbon nanotubes, or silicone comprising graphene particles, or silicone comprising silver nanowires, or silicone coated with a metal layer (e.g. comprising iron, nickel, copper, etc.).

Example 34 is configured according to any one of examples 1 to 33, wherein a thickness of the first electrode (e.g., in a region of about 200 nm to about 80 μm) corresponds to the summed thicknesses of the second electrode and the third electrode, or wherein the thickness of the first electrode layer corresponds to the summed thicknesses of the second electrode layer and the third electrode layer.

Example 35 is configured according to one of examples 1 to 34, wherein the side of the first layer contacting the first electrode, the side of the first layer contacting the second electrode, the side of the second layer contacting the first electrode, and/or the side of the second layer contacting the third electrode comprises a structured surface in the normal direction of the respective surface.

Example 36 is configured according to example 35, wherein the structured surface comprises a (e.g. regular) wave structure.

Example 37 is a speaker according to any one of examples 1 to 36, wherein the speaker does not comprise a permanent magnet.

Example 38 is configured according to any one of examples 1 to 37, wherein the speaker does not comprise a permanent magnetic material. According to various embodiments, the speaker may also not comprise a ferroelectric material.

Example 39 is configured according to one of examples 1 to 38, wherein an upper edge region and/or a lower edge region of the first layer is free from the first electrode and/or free from the second electrode, and/or wherein an upper edge region and/or a lower edge region of the second layer is free from the first electrode and/or free from the third electrode.

Example 40 is a pump comprising: a housing filled with gas and/or liquid; a rotary actuator disposed in the gas and/or liquid and comprising a wound laminate, the laminate comprising a first layer and a second layer, each comprising or consisting of a dielectric elastomer; a first electrode disposed between the first layer and the second layer in direct contact therewith; a second metal film disposed between a first sub-layer of the first electrode and a second sub-layer of the first electrode and electrically conductively connected thereto; a second electrode disposed on a side of the first layer distal from the first electrode and in direct contact with the first layer; a third electrode disposed on a side of the second layer distal from the first electrode and in direct contact with the second layer; and a first metal film (e.g., aluminum film) that is electrically conductively connected to the third electrode.

Example 41 is a pump comprising: a housing filled with gas and/or liquid; a multi-layered, hollow cylindrical rotary actuator disposed in the gas and/or liquid and comprising one or more layer stacks disposed substantially concentrically with the shell surface of the rotary actuator, each of the one or more layer stacks comprising a first layer and a second layer, each comprising or consisting of a dielectric elastomer; a second metal layer disposed between the first layer and the second layer; a first electrode layer disposed between and in direct contact with the first layer and the second metal layer; a fourth electrode layer disposed between and in direct contact with the second layer and the second metal layer; a second electrode layer disposed on a side of the first layer that is distal from the first electrode layer and in direct contact with the first layer; a third electrode layer disposed on a side of the second layer that is distal from the fourth electrode layer and in direct contact with the second layer; and a first metal layer (e.g., aluminum layer) that is electrically conductively connected to the third electrode layer (e.g. by means of a carbon layer).

Example 42 is a method of manufacturing a speaker (e.g. a speaker according to any one of Examples 1 to 39), the method comprising coating a first side of a sheet with a first electrode material, the sheet comprising or consisting of a dielectric elastomer, coating a second side of the sheet opposite the first side with a second electrode material; rolling a first end of the sheet onto a first reel and a second end of the sheet onto a second reel such that a central region of the sheet is not rolled onto either the first reel or the second reel; folding the central region of the coated sheets around a second metal film unwound from a third reel such that the metal film coated on a first portion (e.g. one half) of the sheet contacts a first side of the second metal film and that the first electrode material arranged on a second portion (e.g. the other half) of the sheet contacts a second side of the second metal film opposite to the first side; bringing together one side of the sheet folded around the second metal film and one side of a first metal film (e.g. aluminum film) unwound from a fourth roll to form a sheet; and winding the laminate onto a fifth roll by unwinding the sheet from the first roll and the second roll, the second metal film from the third roll and the first metal film from the fourth roll such that the laminate has an elongation of less than 50% in the wound state.

Example 43 is configured according to example 42, wherein the folded sheet and the first metal film are brought together to form the laminate in such a way that the folded sheet and the first metal film are electrically conductively connected to one another.

Example 44 is a method according to example 42 or 43, wherein the coating of the sheet with the first electrode material comprises spraying the first electrode material onto the sheet or coating the sheet by means of screen printing, and/or wherein the coating of the sheet with the second electrode material comprises spraying the second electrode material onto the sheet or coating the sheet by means of screen printing.

The coating of the sheet with the first electrode material and/or the coating of the sheet with the second electrode material may take place before the first end of the sheet is rolled onto the first roll and the second end of the sheet is rolled onto the second roll, or may take place after this rolling.

Example 45 is configured according to any one of examples 42 to 44, wherein the first electrode material corresponds to the second electrode material.

Example 46 is a method according to any one of examples 42 to 45, further comprising: before folding the coated sheets, removing (e.g. by etching) the first electrode material from an upper edge region and/or a lower edge region of the first side of the sheet in the winding direction of the sheet, and/or removing (e.g. by etching) the second electrode material from an upper edge region and/or a lower edge region of the second side of the sheet in the winding direction of the sheet.

Example 47 is a method according to any one of examples 42 to 45, wherein the coating of the first side of the sheet comprises coating the first side of the sheet with the first electrode material such that an upper edge region and/or a lower edge region of the first side of the sheet is free of the first electrode material in the winding direction of the sheet, and/or wherein the coating of the second side of the sheet comprises: coating the second side of the sheet with the second electrode material in such a way that an upper edge region and/or a lower edge region of the second side of the sheet is free of the second electrode material in the winding direction of the sheet.

Example 48 is a method according to any one of examples 42 to 47, further comprising: separating the wound laminate and the fifth roll (e.g. such that the wound laminate encloses a cavity).

In example 49, the method according to example 48 may optionally further comprise: after separating the wound laminate and the fifth roll, arranging the wound laminate on a vibrating body (e.g. a speaker diaphragm) in the direction of radiation of the speaker perpendicular to the vibrating body.

Example 50 is a computer-readable medium (e.g., a computer program product, a non-volatile storage medium, a non-transitory storage medium, a non-volatile storage medium) capable of storing instructions that, when executed by a processor, cause the processor to control a device to perform a method according to one or more of the forty-second example through the forty-ninth example.

The invention claimed is:

1. A speaker, comprising:

a rotary actuator comprising a wound laminate, wherein the wound laminate comprises a roll, wherein the wound laminate comprises:

a first layer and a second layer, each comprising or consisting of a dielectric elastomer;

a first electrode arranged between the first layer and the second layer in direct contact therewith;

a second metal layer, which is arranged between a first sub-layer of the first electrode and a second sub-layer of the first electrode and is electrically conductively connected thereto;

a second electrode, which is arranged on a side of the first layer distal to the first electrode and in direct contact with the first layer;

a third electrode disposed on a side of the second layer distal from the first electrode and in direct contact with the second layer; and a first metal layer, which is electrically conductively connected to the third electrode.

2. The speaker according to claim 1, wherein a mechanical tension acting on the wound laminate induces an elongation of the wound laminate, wherein the elongation is less than 50%.

3. The speaker according to claim 1, wherein the second metal layer is a metal film and wherein the wound laminate comprises a folded substrate sheet which is in an unfolded state:

a substrate layer comprising or consisting of the dielectric elastomer;

a first electrode layer disposed on a first side of the substrate layer and in direct contact with the substrate layer; and a second electrode layer arranged on a second side of the substrate layer opposite the first side and in direct contact with the second side of the substrate layer, wherein the substrate sheet is folded such that the first electrode layer arranged on a first portion of the substrate sheet contacts a first side of the metal film and that the first electrode layer arranged on a second portion of the substrate sheet contacts a second side of the metal film opposite the first side, such that:

the first electrode layer forms the first electrode;

the substrate sheet forms the first layer in the first section of the substrate sheet;

the second electrode layer arranged on the first section of the substrate sheet forms the second electrode;

the substrate sheet forms the second layer in the second portion of the substrate sheet; and the second electrode layer arranged on the second section of the substrate sheet forms the third electrode.

4. The speaker according to claim 1, wherein the wound laminate comprises in each winding at least one first sheet portion which is electrically conductively connected to the first metal layer and projects in the axial direction of the rotary actuator beyond a first end of the first layer and the second layer in such a way that the first metal layer may be electrically conductively contacted in each winding of the wound laminate by means of the first sheet portions; and the wound laminate comprising in each winding at least one second sheet portion which is electrically conductively connected to the second metal layer and projects in the axial direction of the rotary actuator beyond a second end of the first layer opposite the first end and the second layer in such a way that the second metal layer may be electrically conductively contacted in each winding of the wound laminate by means of the second sheet portions (152).

5. The speaker according to claim 4, wherein the first metal layer is a first metal film and wherein the first metal film comprises the first sheet portions; and/or wherein the second metal layer is a second metal film, and wherein the second metal film comprises the second sheet portions.

6. The speaker according to claim 1, wherein the wound laminate encloses a cavity.

7. The speaker according to claim 1, wherein the electrical resistance of the first metal layer and/or the electrical resistance of the second metal layer is less than or equal to $30 \cdot 10^6$ S/m, and/or;

wherein the density of the first metal layer and/or the density of the second metal layer is less than or equal to 3 g/cm$^3$ and/or wherein the first metal layer and/or the second metal layer comprises or consists of aluminum.

8. The speaker according to claim 1, wherein the ratio of the outer diameter ($d_a$) of the rotary actuator to the inner diameter ($d_i$) of the rotary actuator is greater than or 1.25.

9. The speaker according to claim 1, wherein:

the side of the first layer contacting the first electrode;

the side of the first layer contacting the second electrode;

the side of the second layer contacting the first electrode; and/or the side of the second layer contacting the third electrode comprising a structured surface in the normal direction of the respective surface, wherein the structured surface preferably comprises a wave structure.

10. The speaker according to claim 1, wherein the speaker does not comprise a permanent magnetic material, and/or wherein the speaker does not comprise a ferroelectric material.

11. The speaker according to claim 1, wherein an upper edge region and/or a lower edge region of the first layer is free of the first electrode and/or free of the second electrode, and/or wherein an upper edge region and/or a lower edge region of the second layer is free from the first electrode and/or free from the third electrode.

12. The speaker, comprising:

a vibrating body;

a rotary actuator comprising a wound sheet, wherein the sheet comprises:

a first layer and a second layer, each comprising or consisting of a dielectric elastomer;

a first electrode arranged between the first layer and the second layer in direct contact therewith;

a second electrode disposed on a side of the first layer distal from the first electrode and in direct contact with the first layer; and a third electrode, which is arranged on a side of the second layer distal to the first electrode and in direct contact with the second layer, wherein the rotary actuator is arranged at least partially above the vibrating body in the direction of radiation of the speaker.

13. The speaker according to claim 12, wherein the vibrating body is a speaker diaphragm, wherein the speaker cone comprises a concavely curved surface and wherein the rotary actuator is arranged on the concavely curved surface of the speaker cone.

14. A method of manufacturing a speaker, comprising the method:

coating a first side of a sheet with a first electrode material, the sheet comprising or consisting of a dielectric elastomer;

coating a second side of the sheet opposite the first side with a second electrode material;

rolling a first end of the sheet onto a first roll and a second end of the sheet onto a second roll such that a central region of the sheet is not rolled onto either the first roll or the second roll;

folding the center region of the coated sheet around a second metal film unwound from a third roll such that the first electrode material arranged on a first portion of the sheet contacts a first side of the second metal film and that the first electrode material arranged on a second portion of the sheet contacts a second side of the second metal film opposite the first side;

bringing together one side of the sheet folded around the second metal film and one side of a first metal film unwound from a fourth roll to form a laminate; and winding the laminate onto a fifth roll by unwinding the sheet from the first roll and the second roll, the second metal film from the third roll and the first metal film from the fourth roll in such a way that the laminate has an elongation of less than 50% in the wound state.

15. The method according to claim 14, further comprising:

separating the wound laminate and the fifth roll so that the wound laminate encloses a cavity; and arranging of the wound laminate on a vibrating body in the direction of radiation of the speaker perpendicular to the vibrating body.

* * * * *